United States Patent
Sasaki et al.

(10) Patent No.: US 8,245,272 B2
(45) Date of Patent: Aug. 14, 2012

(54) SYSTEM AND METHOD FOR MONITORING COMPUTER SYSTEM RESOURCE PERFORMANCE

(75) Inventors: Hidetaka Sasaki, Yokohama (JP); Hideo Ohata, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1171 days.

(21) Appl. No.: 12/023,124

(22) Filed: Jan. 31, 2008

(65) Prior Publication Data

US 2008/0301763 A1 Dec. 4, 2008

(30) Foreign Application Priority Data

May 29, 2007 (JP) ................... 2007-141772

(51) Int. Cl.
*G06F 17/00* (2006.01)
(52) U.S. Cl. ......................................... 726/1
(58) Field of Classification Search ........... 726/1
See application file for complete search history.

(56) References Cited

U.S. PATENT DOCUMENTS

| 6,032,224 | A | 2/2000 | Blumenau |
| 6,453,434 | B2 * | 9/2002 | Delp et al. ............... 714/718 |
| 7,085,954 | B2 * | 8/2006 | Furukawa et al. ......... 714/5 |
| 7,120,832 | B2 | 10/2006 | Collins et al. |
| 7,631,023 | B1 * | 12/2009 | Kaiser et al. ............... 1/1 |
| 2005/0114494 | A1 * | 5/2005 | Beck et al. ............ 709/224 |
| 2008/0091898 | A1 | 4/2008 | Takahashi et al. |

* cited by examiner

*Primary Examiner* — Haresh N Patel
*Assistant Examiner* — Lawrence Cosby
(74) *Attorney, Agent, or Firm* — Sughrue Mion, PLLC

(57) ABSTRACT

According to the present invention, policies are prepared for a plurality of resources residing in a computer system comprising a storage system for copying data from a copy source volume to a copy target volume, and an evaluation is carried out for an evaluation-target resource of the plurality of resources for determining whether or not to execute a predefined action based on the policy of this evaluation-target resource. A policy corresponding to a resource related to copying of the plurality of resources is determined based on a time period related to the copying.

15 Claims, 20 Drawing Sheets

FIG. 7

METRIC VALUE INFORMATION 313

| | | | |
|---|---|---|---|
| 2007/03/28 05:00:00 | APPLICATION A | RESPONSE TIME | 2.3 |
| 2007/03/28 05:00:00 | APPLICATION A | THROUGHPUT | 25.2 |
| 2007/03/28 05:00:00 | APPLICATION B | RESPONSE TIME | 3.1 |
| 2007/03/28 05:00:00 | APPLICATION B | THROUGHPUT | 19.3 |
| ⋮ | ⋮ | ⋮ | ⋮ |
| 2007/03/28 05:00:00 | LOGICAL VOLUME C | NO. OF I/Os PER SECOND | 1.40 |
| 2007/03/28 05:00:00 | LOGICAL VOLUME C | TRANSMISSION RATE | 22.67 |
| 2007/03/28 05:00:00 | LOGICAL VOLUME D | NO. OF I/Os PER SECOND | 0.00 |
| 2007/03/28 05:00:00 | LOGICAL VOLUME D | TRANSMISSION RATE | 0.00 |
| 2007/03/28 05:01:00 | APPLICATION A | RESPONSE TIME | 16.51 |
| 2007/03/28 05:01:00 | APPLICATION A | THROUGHPUT | 175.74 |
| 2007/03/28 05:01:00 | APPLICATION B | RESPONSE TIME | 15.41 |
| 2007/03/28 05:01:00 | APPLICATION B | THROUGHPUT | 100.21 |
| ⋮ | ⋮ | ⋮ | ⋮ |
| 2007/03/28 05:01:00 | LOGICAL VOLUME C | NO. OF I/Os PER SECOND | 1.94 |
| 2007/03/28 05:01:00 | LOGICAL VOLUME C | TRANSMISSION RATE | 31.42 |
| 2007/03/28 05:01:00 | LOGICAL VOLUME D | NO. OF I/Os PER SECOND | 0.00 |
| 2007/03/28 05:01:00 | LOGICAL VOLUME D | TRANSMISSION RATE | 0.01 |
| 2007/03/28 05:02:00 | APPLICATION A | RESPONSE TIME | 16.58 |
| 2007/03/28 05:02:00 | APPLICATION A | THROUGHPUT | 175.77 |
| 2007/03/28 05:02:00 | APPLICATION B | RESPONSE TIME | 15.27 |
| 2007/03/28 05:02:00 | APPLICATION B | THROUGHPUT | 100.33 |
| ⋮ | ⋮ | ⋮ | ⋮ |
| 2007/03/28 05:02:00 | LOGICAL VOLUME C | NO. OF I/Os PER SECOND | 1.90 |
| 2007/03/28 05:02:00 | LOGICAL VOLUME C | TRANSMISSION RATE | 30.81 |
| 2007/03/28 05:02:00 | LOGICAL VOLUME D | NO. OF I/Os PER SECOND | 1.03 |
| 2007/03/28 05:02:00 | LOGICAL VOLUME D | TRANSMISSION RATE | 10.47 |

APPLICATION-FILE ASSOCIATION INFORMATION 801

| APPLICATION A | FILE A |
|---|---|
| APPLICATION A | FILE B |
| APPLICATION B | FILE C |
| APPLICATION C | FILE D |
| APPLICATION D | FILE E |

FILE-LOGICAL DEVICE ASSOCIATION INFORMATION 901

| FILE A | LOGICAL DEVICE A |
|---|---|
| FILE B | LOGICAL DEVICE B |
| FILE C | LOGICAL DEVICE B |
| FILE D | LOGICAL DEVICE C |
| FILE E | LOGICAL DEVICE D |

LOGICAL VOLUME-ARRAY GROUP ASSOCIATION INFORMATION 1001

| LOGICAL VOLUME A | ARRAY GROUP A |
|---|---|
| LOGICAL VOLUME B | ARRAY GROUP A |
| LOGICAL VOLUME E | ARRAY GROUP B |
| LOGICAL VOLUME C | ARRAY GROUP B |
| LOGICAL VOLUME F | ARRAY GROUP C |
| LOGICAL VOLUME D | ARRAY GROUP C |

LOGICAL VOLUME INFORMATION 1101

| LOGICAL VOLUME A | 01 |
|---|---|
| LOGICAL VOLUME B | 02 |
| LOGICAL VOLUME E | 05 |
| LOGICAL VOLUME C | 03 |
| LOGICAL VOLUME F | 06 |
| LOGICAL VOLUME D | 04 |

LOGICAL DEVICE-LOGICAL VOLUME-PORT CORRESPONDENCE INFORMATION 1201

| LOGICAL DEVICE A | LOGICAL VOLUME A | PORT A | PORT U | {PORT E, PORT I, PORT M, PORT Q} |
|---|---|---|---|---|
| LOGICAL DEVICE B | LOGICAL VOLUME B | PORT B | PORT V | {PORT F, PORT J, PORT N, PORT R} |
| LOGICAL DEVICE C | LOGICAL VOLUME C | PORT C | PORT W | {PORT G, PORT K, PORT O, PORT S} |
| LOGICAL DEVICE D | LOGICAL VOLUME D | PORT D | PORT X | {PORT H, PORT L, PORT P, PORT T} |
| 1202 | 1203 | 1204 | 1205 | 1206 |

FIG. 13

I/O PATH INFORMATION    319

| PATH A1 | APPLICATION A |
| PATH A1 | FILE A |
| PATH A1 | LOGICAL DEVICE A |
| : | : |
| PATH A1 | LOGICAL VOLUME A |
| PATH A1 | ARRAY GROUP A |
| : | : |
| PATH A2 | APPLICATION A |
| PATH A2 | FILE B |
| PATH A2 | LOGICAL DEVICE B |
| : | : |
| PATH A2 | LOGICAL VOLUME B |
| PATH A2 | ARRAY GROUP A |
| : | : |
| PATH D | APPLICATION D |
| PATH D | FILE E |
| PATH D | LOGICAL DEVICE D |
| : | : |
| PATH D | LOGICAL VOLUME D |
| PATH D | ARRAY GROUP C |

TIER INFORMATION 326

| TIER A | LOGICAL VOLUME A |
|---|---|
| TIER A | LOGICAL VOLUME B |
| TIER B | LOGICAL VOLUME C |
| TIER B | LOGICAL VOLUME D |
| TIER B | LOGICAL VOLUME E |
| TIER B | LOGICAL VOLUME F |

MIGRATION INFORMATION 325

| MIGRATION 1 | 02 | 05 | WAITING | – |
|---|---|---|---|---|
| MIGRATION 2 | 01 | 06 | COMPLETE | 2007/03/28 05:00:00 |
| : | : | : | : | : |

MIGRATION I/O PATH INFORMATION 323

| PATH 1 | MIGRATION 1 | ARRAY GROUP A |
|---|---|---|
| PATH 1 | MIGRATION 1 | LOGICAL VOLUME B |
| PATH 1 | MIGRATION 1 | LOGICAL VOLUME E |
| PATH 1 | MIGRATION 1 | ARRAY GROUP B |

ALERT INFORMATION 316

| 1702 | 1703 | 1704 | 1705 | 1706 | 1707 | 1708 | 1709 | 1710 | 1711 |
|---|---|---|---|---|---|---|---|---|---|
| NORMAL PROCESSING | — | APPLICATION A | RESPONSE TIME | 5 | 20 | E-MAIL | mail1, ad@com | VALID | 2007/03/28 05:00:00 |
| NORMAL PROCESSING | — | APPLICATION A | THROUGHPUT | 20 | 20 | E-MAIL | mail1, ad@com | VALID | 2007/03/28 05:00:00 |
| .. | .. | .. | .. | .. | .. | .. | .. | .. | .. |
| NORMAL PROCESSING | — | LOGICAL VOLUME A | NO. OF I/Os PER SECOND | 20 | 15 | SNMP | snmp3 | VALID | 2007/03/28 05:00:00 |
| NORMAL PROCESSING | — | LOGICAL VOLUME A | TRANSMISSION RATE | 50 | 15 | SNMP | snmp3 | VALID | 2007/03/28 05:00:00 |
| NORMAL PROCESSING | — | LOGICAL VOLUME B | NO. OF I/Os PER SECOND | 20 | 15 | SNMP | snmp3 | VALID | 2007/03/28 05:00:00 |
| NORMAL PROCESSING | — | LOGICAL VOLUME B | TRANSMISSION RATE | 50 | 15 | SNMP | snmp3 | VALID | 2007/03/28 05:00:00 |
| MIGRATION PERIOD | MIGRATION 1 | LOGICAL VOLUME C | NO. OF I/Os PER SECOND | 10 | 30 | SNMP | snmp3 | VALID | 2007/03/28 05:00:00 |
| TRIAL PERIOD | MIGRATION 1 | LOGICAL VOLUME C | TRANSMISSION RATE | 25 | 30 | SNMP | snmp3 | VALID | 2007/03/28 05:00:00 |
| .. | .. | .. | .. | .. | .. | .. | .. | .. | .. |

FIG. 18

ALERT HISTORY INFORMATION 327

| 03 | LOGICAL VOLUME A | NO. OF I/Os PER SECOND | 18 | 5 | SNMP | snmpsv3 |
|---|---|---|---|---|---|---|
| 03 | LOGICAL VOLUME A | TRANSMISSION RATE | 45 | 5 | SNMP | snmpsv3 |
| 04 | LOGICAL VOLUME B | NO. OF I/Os PER SECOND | 18 | 5 | SNMP | snmpsv3 |
| 04 | LOGICAL VOLUME B | TRANSMISSION RATE | 45 | 5 | SNMP | snmpsv3 |
| : | : | : | : | : | : | : |
| 1802 | 1803 | 1804 | 1805 | 1806 | 1807 | 1808 |

FIG. 19

ALERT GENERATION CONTROL INFORMATION 321

| 1,440 | 5 | 1 | 1.2 |
|---|---|---|---|
| 1902 | 1903 | 1904 | 1905 |

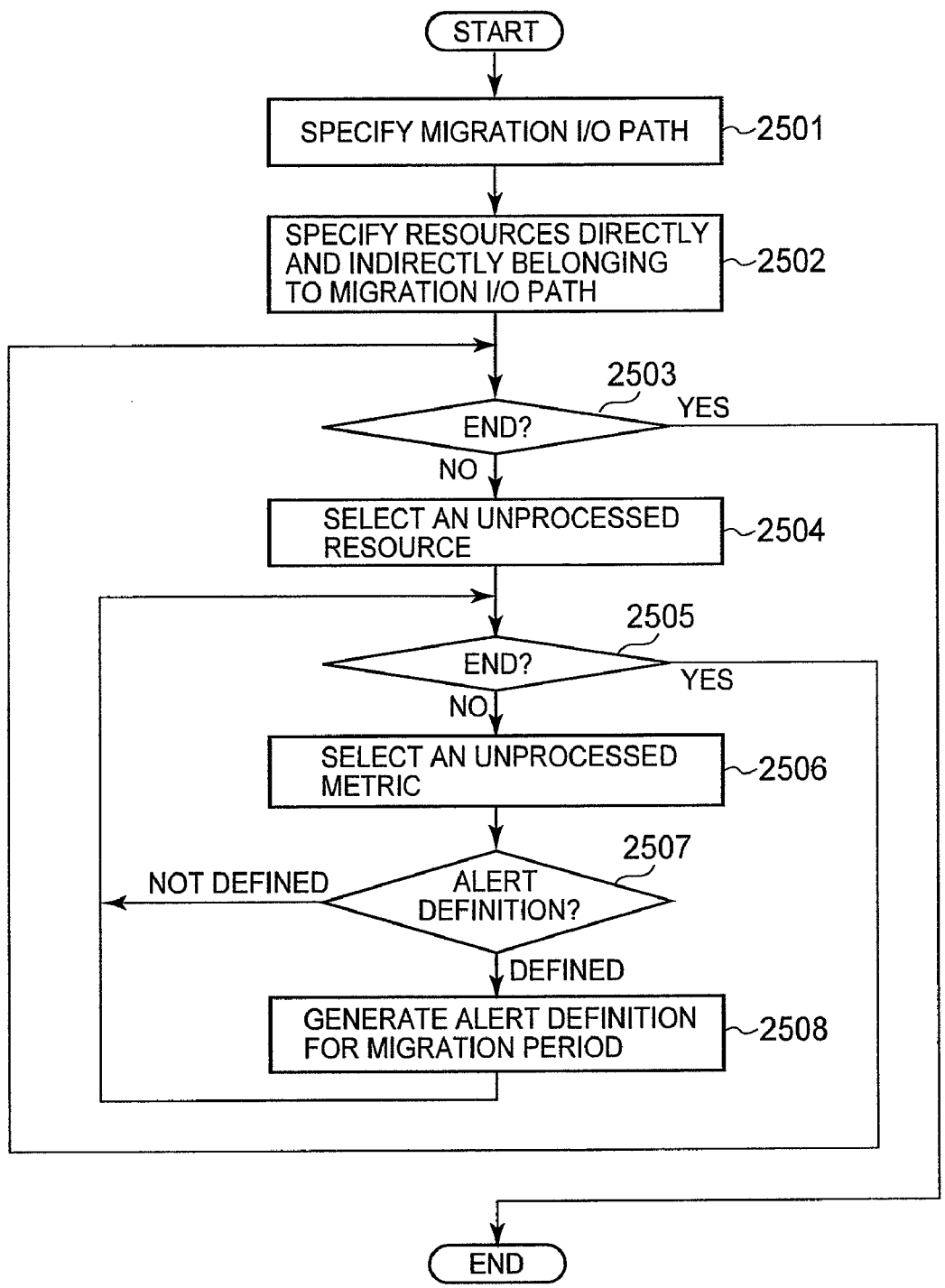

SYSTEM AND METHOD FOR MONITORING COMPUTER SYSTEM RESOURCE PERFORMANCE

CROSS-REFERENCE TO RELATED APPLICATIONS

This application relates to and claims the benefit of priority from Japanese Patent Application No. 2007-141772 filed on May 29, 2007, the entire disclosure of which is incorporated herein by reference.

BACKGROUND

The present invention generally relates to monitoring the performance of a resource, which resides in a computer system.

A storage device is one target of performance monitoring. Technology related to monitoring the performance of a storage device using a threshold is known (For example, U.S. Pat. No. 6,032,224 and U.S. Pat. No. 7,120,832).

There is technology for making the one of a plurality of logical volumes, which resides in a storage system, a copy source, making the other of this plurality of logical volumes a copy target, and copying data stored in the copy source volume to the copy target volume. For a copy to be performed, input/output, which is different from input/output to a logical volume in accordance with an I/O command sent from a host computer, is carried out. Thus, a difference in the performance actually capable of being manifested can occur between a resource, which is involved in the copying of data, and a resource, which is not involved in this copying, even though the capabilities of these resources are substantially the same.

SUMMARY

Therefore, an object of the present invention is to properly monitor the performance of resources related to data copying.

Further objects of the present invention should become clear from the following descriptions.

Respective policies are prepared for a plurality of resources, which reside in a computer system comprising a storage system for copying data from a copy source volume to a copy target volume, and an evaluation which is to determine whether or not to execute a predefined action is carried out on an evaluation-target resource from among the plurality of resources based on the policy of this evaluation-target resource. A policy corresponding to a copy-related resource of this plurality of resources is determined based on the time period related to this copying.

BRIEF DESCRIPTION OF THE DRAWINGS

FIG. 7 shows an example of the configuration of metric value information;

FIG. 8 shows an example of the configuration of application-file association information;

FIG. 9 shows an example of the configuration of file-logical device association information;

FIG. 10 shows an example of the configuration of logical volume-array group association information;

FIG. 11 shows an example of the configuration of logical volume information;

FIG. 12 shows an example of the configuration of logical device, logical volume and port correspondence information;

FIG. 13 shows an example of the configuration of I/O path information;

FIG. 14 shows an example of the configuration of tier information;

FIG. 15 shows an example of the configuration of migration information;

FIG. 16 shows an example of the configuration of migration I/O path information;

FIG. 17 shows an example of the configuration of alert information;

FIG. 18 shows an example of the configuration of alert history information;

FIG. 19 shows an example of the configuration of alert generation control information;

FIG. 25 is a flowchart of the processing in Step 2203 of FIG. 22.

DESCRIPTION OF THE PREFERRED EMBODIMENTS

Figure 1:
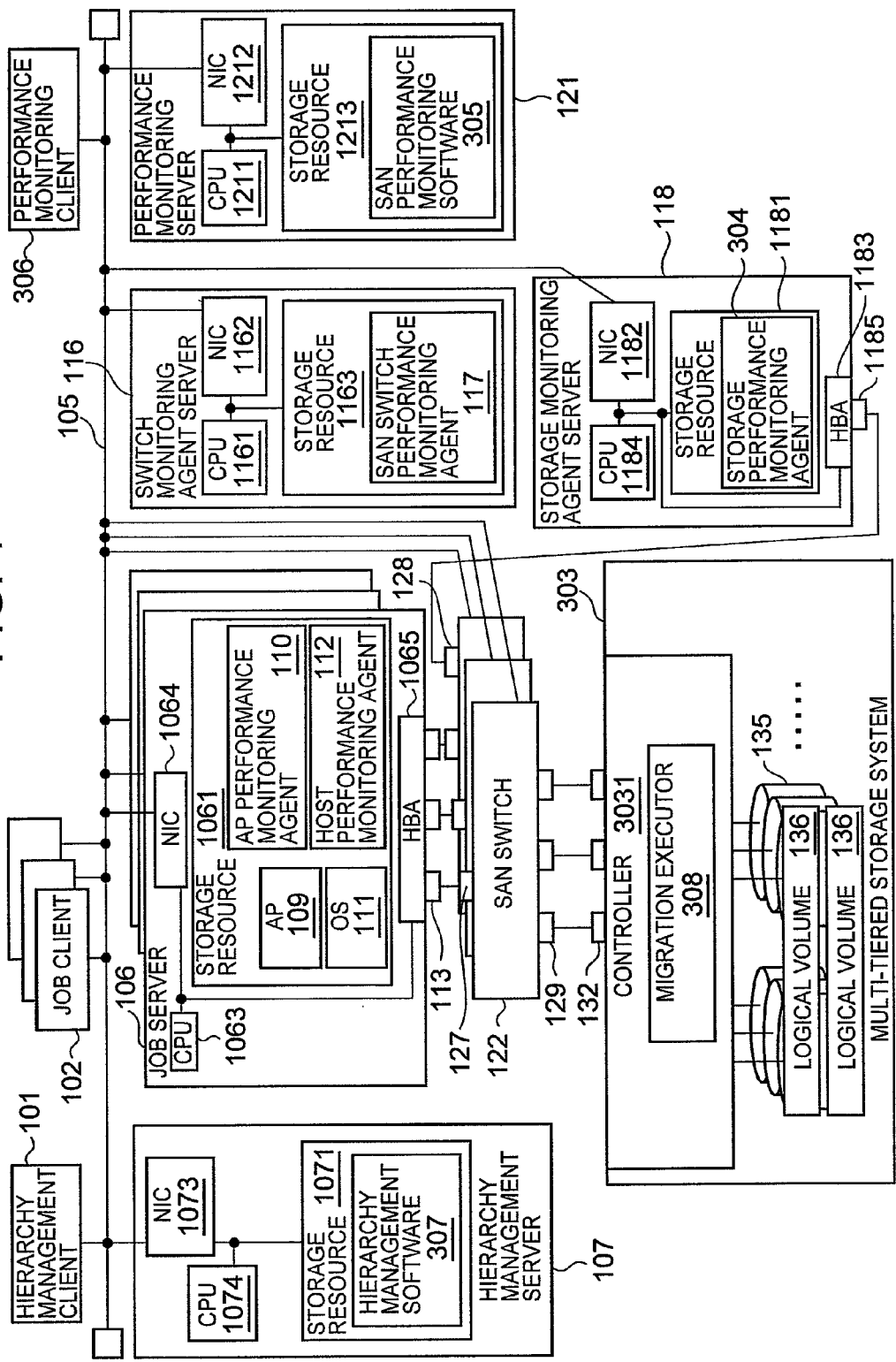
FIG. 1 shows an example of an overall constitution of a system related to an embodiment of the present invention.

In one embodiment, a management device, which monitors the performance of a plurality of resources residing in a computer system comprising a storage system, which copies data from a copy source volume to a copy target volume, comprises a policy determination unit; and a resource evaluation unit. The policy determination unit determines, based on the time period related to this copy, a policy corresponding to a resource involved in copying in policy information expressing a plurality of policies corresponding to a plurality of resources. The resource evaluation unit determines whether or not to execute a predefined action based on a policy of a plurality of policies, which corresponds to an evaluation-target resource of a plurality of resources, using a performance value of this evaluation-target resource.

The policy determination unit, for example, corresponds to an alert generator 320, which will be explained hereinbelow, and the resource evaluation unit, for example, corresponds to an alert execution unit 310, which will be described hereinbelow.

A "copy", for example, comprises both a replication and a migration. In other words, copy-target data can remain in the copy source volume or not.

"Resource", for example, designates physical and logical components of a computer system (SAN (Storage Area Network) in the examples of the embodiments explained below). More specifically, for example, a resource is a piece of hardware constituting a computer system (for example, a storage subsystem, SAN switch, job server, and so forth) and the physical as well as logical components thereof (for example, a port, CPU, cache memory, array group, logical volume, and so forth), a program executed on the hardware (for example, an operating system, database management system, email server, and so forth), and the logical components thereof (a file, table, and so forth).

In one embodiment, a resource involved in copying is a copy target volume. The policy determination unit can reference tier management information expressing the relationship between a plurality of tiers and a plurality of resources of a storage system, and can determine a policy corresponding to a copy target volume subsequent to copying having ended, based on the performance value and/or policy of a resource belonging to a first tier to which a copy source volume of a plurality of logical volumes belongs, and the performance value and/or policy of a resource belonging to a second tier to which a copy target volume of a plurality of logical volumes belongs.

A "tier", for example, is a level or layer in a hierarchical structure constructed logically in the storage system. Assignment to a tier can be carried out in prescribed units, for example, as a logical volume unit, an array group unit, and a storage subsystem unit. When an element other than a logical volume belongs to a tier, all the logical volumes in this element belong to this tier. More specifically, for example, when an array group belongs to a tier, all the logical volumes in this array group belong to this tier, and when a storage subsystem belongs to a tier, all the logical volumes in this storage subsystem belong to this tier. Furthermore, a "storage subsystem" constitutes a storage system, and is an apparatus, which has a logical volume, and a controller for controlling access to this logical volume. When there is one storage subsystem, this storage subsystem becomes the storage system.

In one embodiment, a policy is a threshold, which is compared against a performance value of a resource. The policy determination unit determines the threshold corresponding to the copy target volume based on the performance value of a resource belonging to a first tier and the performance value of a resource belonging to a second tier.

In one embodiment, a policy is an interval of time for executing an evaluation, which is a determination as to whether or not to execute an action based on the performance value of a resource. The policy determination unit determines an evaluation time interval corresponding to the copy target volume based on both the evaluation time interval of a resource belonging to the first tier and the evaluation time interval of a resource belonging to the second tier, or on the evaluation time interval of a resource belonging to the second tier.

In one embodiment, the management device further comprises a history manager. The history manager adds information expressing the corresponding relationship between an identifier of the copy source volume and a policy corresponding to this copy source volume to history information expressing the history of the corresponding relationship. When either the copy target volume or the second tier to which this copy target volume belongs coincides with either the copy source volume specified from the history information or the tier to which this copy source volume belongs, the policy determination unit can determine that either the policy corresponding to this copy source volume, or the policy corresponding to another logical volume belonging to this tier is the policy of the copy target volume.

In one embodiment, the policy determination unit references path management information expressing which resource belongs to which path, and specifies resources that directly and indirectly belong to the path of the copy source volume, and resources that directly and indirectly belong to the path of the copy target volume as the resources involved in a copy. The policy determination unit determines a certain-period policy, which corresponds to a certain period from immediately subsequent to the end of copying until a fixed time has elapsed, for the specified resources. During this certain period, the resource evaluation unit uses the performance value of this evaluation-target resource to determine whether or not to execute an action based on the determined certain-period policy mentioned above.

In one embodiment, the certain-period policy is deemed a stricter policy that the policy for a period subsequent to the certain period. More specifically, for example, when the policy is either a time interval for executing an evaluation, which uses the performance value of a resource to determine whether or not to execute an action, or the number of performance values acquired in an evaluation time interval, the evaluation time interval for the certain period is shorter than the evaluation time interval for a period subsequent to the certain period, and the above-mentioned number of performance values for the certain period is larger than the number of performance values acquired subsequent to the certain period.

In one embodiment, the management device further comprises an action execution controller for validating the determined certain-period policy subsequent to the end of a copy. If the certain-period policy is not valid, the resource evaluation unit does not execute a determination based on this certain-period policy, and if this certain-period policy is valid, the resource evaluation unit executes a determination based on this certain-period policy.

In one embodiment, the policy determination unit references path management information expressing which resource belongs to which path, and specifies resource that directly and indirectly belong to the path over which data passes during copying from a copy source volume to a copy target volume as the resources related to the copying, and determines a copy-period policy, which corresponds to an execution period of the copying, for the specified resources. During the copy execution period, the resource evaluation unit, using the performance value of this evaluation-target resource, determines whether or not to execute an action based on the determined copy-period policy.

In one embodiment, the policy is either a threshold which is compared against the performance value of a resource, an interval of time for executing an evaluation, which uses the performance value of a resource to determine whether or not to execute an action, or the number of performance values acquired during an evaluation time interval. The policy determination unit determines that the copy-period threshold, evaluation time interval, or number of performance values corresponding to the specified resource is either a pre-defined value, or a value obtained by correcting this value.

In one embodiment, if it is determined during the copy execution period to execute an action for an evaluation-target resource, the resource evaluation unit indicates to the storage system to suspend or retard copying as the action execution.

In one embodiment, the management device further comprises an action execution controller for validating a determined copy-period policy during a copy period. If the copy-period policy is not valid, the resource evaluation unit does not execute a determination based on this copy-period policy, and if this copy-period policy is valid, the resource evaluation unit executes a determination based on this copy-period policy.

Two or more of the above-described plurality of embodiments can be combined together. Further, the respective units mentioned above (for example, the policy determination unit, the resource evaluation unit, the action execution controller, and the history manager) can either replace or be used in addition to the management device, and can reside in a host computer or the storage system. Further, the respective units mentioned above can be constructed using hardware, computer programs or a combination thereof (for example, a portion can be realized using a computer program, and the remainder can be realized via hardware). A computer program is read in and executed by a prescribed processor. Further, when a computer program is read into a processor and information processing is carried out, a storage area, which resides in a memory or other such hardware resource, can be utilized as needed. Also, a computer program can be installed in a computer from a CD-ROM or other such recording medium, or downloaded to a computer via a communication network.

An embodiment of the present invention, in which migration is employed as a copy, will be explained in detail hereinbelow.

First, the terminology used in the following explanation, such as "metric value", "alert definition", "action method", "migration", "trial period", "migration period" and "normal processing" will be explained.

A "metric value" is the performance value of a performance-monitoring-target resource, which corresponds to a metric (a performance item related to a resource). As metric values, for example, in the case of a storage system there are CPU utilization rate, cache memory utilization capacity, logical volume IOPS (number of I/O commands received per second), and I/O processing time (length of time required to process one I/O command). Further, for example, as metric values for a SAN switch, there are the transmission rate and reception rate for each port.

An "alert definition" is information related to an alert, and, more specifically, is information expressing an alert condition and an action method. An "alert" is a function for automatically notifying a user (for example, the storage system administrator or user) of a phenomenon, such as when the metric value of a resource is in a certain state. An alert condition, for example, is defined by a metric value threshold and a metric value evaluation interval. An alert definition can be configured for the various metrics of the respective resources.

An "action method" is a method for notifying how an action is to be executed, and more specifically, for example, for notifying of the occurrence of a phenomenon in which a metric value is not less than (or not more than) a threshold. As examples of specific notification methods, there are e-mail transmission, command execution, and performance report preparation.

A "migration" is the migration of data between logical volumes, and in this embodiment, more particularly, the migration of data between tiers, and more specifically, refers to the migration of data from a migration source volume of the first tier to a migration target volume of the second tier, which is different from the first tier.

A "trial period" signifies a period from the time when a migration of data from a migration source volume to a migration target volume ends until a fixed time has elapsed.

A "migration period" signifies the period from the migration start time to migration end time.

"Normal processing" signifies a time in a period other than a trial period or a migration period.

In this embodiment, a device is provided based on the following (First Consideration) through (Third Consideration).

(First Consideration) When data inside a first logical volume belonging to a first tier undergoes a migration to a second logical volume belonging to a second tier, it is supposed that there is an alert condition for the first logical volume. A method for passing the alert condition of the first logical volume on to the second logical volume so that this alert condition is utilized for the second logical volume subsequent to migration can be considered, but this method is deemed inappropriate. This is because there are differences in the characteristics of a tier (for example, characteristics from the standpoint of performance) before and after a migration. Thus, a user must define a new alert condition for the second logical volume taking into account the difference in tier characteristics, but if humans are relied on to do this job, there could be a configuration error or configuration omission.

(Second Consideration) Since the access target from the host computer (in this embodiment, a job server) of the storage system switches from the first logical volume to the second logical volume when a migration from the first logical volume to the second logical volume ends, a load resulting from I/O to the second logical volume (hereinafter, I/O load) occurs. However, the increase in I/O load is not limited to the second logical volume, but rather load is likely to increase for all the resources belonging to the I/O path (the path over which an I/O command flows) from a first application program, which is the issuing source of the I/O command specifying the second logical volume, to the second logical volume. Consequently, the resources belonging to another I/O path, which shares the resources belonging to this I/O path, are also likely to be affected from the standpoint of performance. Furthermore, switching the access target of the host computer to the second logical volume prevents the occurrence of I/O load in the first logical volume, and accordingly also reduces I/O load placed on resources belonging to the I/O path from the first application to the first logical volume, but is likely to increase the I/O load placed on the resources belonging to another I/O path, which shares resources belonging to the I/O path. This is because, for example, in a situation in which the metric value for a certain resource, which shares two or more I/O paths, reaches the upper limit, reducing the I/O load on one of the I/O paths of these two or more I/O paths increases the I/O load on the other I/O path. Thus, the I/O load distribution in a computer system changes subsequent to a migration.

(Third Consideration) A migration is realized by reading data from a first logical volume and writing this data to a second logical volume. Thus, during the migration period, the I/O load on the first logical volume, the I/O load on the second logical volume, and the I/O load on the resources belonging to the migration I/O path (path over which data flows due to migration) from the first logical volume to the second logical volume respectively increase temporarily. Consequently, resources belonging to another I/O path, which shares resources belonging to the migration I/O path, are affected performance-wise.

This embodiment will be explained in detail hereinbelow by referring to the figures. Furthermore, in the following explanation, it is supposed that, when the term computer program is the subject, the processing is actually being carried out by the CPU, which executes the computer program.

FIG. 1 shows an example of the overall constitution of a system related to an embodiment of the present invention.

A hierarchy management client 101, hierarchy management server 107, a plurality (or one) of job clients 102, a plurality (or one) of job servers 106, a plurality (or one) of SAN switches 122, a multi-tiered storage system 303, a switch monitoring agent server 116, a storage monitoring agent server 118, a performance monitoring client 306 and a performance monitoring server 121 are connected to a LAN (Local Area Network) 105. The plurality of job servers 106 and the multi-tiered storage system 303 are connected to the plurality of SAN switches 122. A SAN is constituted as a computer system by a job server 106, a SAN switch 122 and the multi-tiered storage system 303. The metric value of a resource residing in this SAN is acquired by the performance monitoring server 121 by way of various agent programs, which will be explained hereinbelow.

A job client 102 is a device for providing a job system user interface function, and communicates with an application 109 or the like inside a job server 106 via the LAN 105. For example, a job client 102 can be a personal computer, workstation, thin client terminal or the like. A job client 102, hierarchy management client 101 and performance monitoring client 306, for example, are a personal computer, workstation, mainframe computer, and thin client terminal.

A job server 106 is a server machine for executing a job. A job server 106, for example, comprises a NIC (Network Interface Card) 1064, a CPU (Central Processing Unit) 1063, storage unit 1061, and HBA (Host Bus Adapter) 1065. The HBA 1065 has ports 113, which are connected to the SAN switches 122. The storage unit 1061, for example, is constituted by a memory and/or another type of storage device (this also holds true for the other storage units 1071, 1213, and so forth, which will be described below). As computer programs executed by the CPU 1063, the storage unit 1061 stores an application 109, which is an application program for executing a job (abbreviated "AP" in the figure), an operating system (OS) 111, an application performance monitoring agent 110, which is an agent program for monitoring the performance of the application 109, and a host performance monitoring agent 112, which is an agent program for monitoring the performance of a job host 106. The application 109 corresponds to a processing request from a job client 102, and carries out data input/output to the multi-tiered storage system 303 as needed (More specifically, the application 109 transmits an I/O command specifying a logical volume 136). Access from the application 109 to the multi-tiered storage system 303 is carried out via the OS 111, HBA port 113, host-side port 127 of a SAN switch 122, a SAN switch 122, storage-side port 129 of the SAN switch 122, and port 132 of the multi-tiered storage system 303.

As hardware for hierarchically managing a plurality of logical volumes 136 inside the multi-tiered storage system 303, there are a hierarchy management client 101 and a hierarchy management server 107, and as the software (computer program) therefore, there is hierarchy management software 307. The hierarchy management server 107, for example, comprises a NIC 1073, a CPU 1074 and a storage unit 1071, and this storage unit 1071 stores the hierarchy management software 307, which is executed by the CPU 1074. The hierarchy management client 101 is a device for providing a user interface function for the hierarchy management software 307, and communicates with the hierarchy management software 307 via the LAN 105. The hierarchy management software 307 manages information showing the corresponding relationship between a logical volume 136 and the tier to which this logical volume 136 belongs, and provides a task management function related to the migration of data between tiers.

As hardware constituting a system for monitoring the performance of a resource, there is the performance monitoring client 306, the performance monitoring server 121, the switch monitoring agent server 116 and the storage monitoring agent server 118, and as the software constituting this system, there is SAN performance monitoring software 305, an application performance monitoring agent 110, the host performance monitoring agent 112, a storage performance monitoring agent 304, and a SAN switch performance monitoring agent 117. The performance monitoring server 121, for example, comprises a CPU 1211, NIC 1212, and a storage unit 1213, and the storage unit 1213, for example, stores the SAN performance monitoring software 305, which is executed by the CPU 1211. The switch monitoring agent server 116, for example, comprises a CPU 1161, NIC 1162 and storage unit 1163, and the storage unit 1163 stores the SAN switch performance monitoring agent 117, which is executed by the CPU 1161. The storage monitoring agent server 118, for example, comprises a CPU 1184, NIC 1182, HBA 1183, and storage unit 1181, and the storage unit 1181, for example, stores the storage performance monitoring agent 304, which is executed by the CPU 1184.

The performance monitoring client 306 is a device for providing a user interface function for the SAN performance monitoring software 305, and communicates with the SAN performance monitoring software 305 of the performance monitoring server 121 via the LAN 105. The SAN performance monitoring software 305 has functions for acquiring and evaluating metric values of resources constituting the SAN. The SAN performance monitoring software 305 respectively utilizes dedicated performance monitoring agent programs to acquire metric values from the various resources (hardware and software) that constitute the SAN. A variety of methods for configuring and arranging the agent programs are possible, and FIG. 1 gives one example of these. That is, the application performance monitoring agent 110 is a computer program for acquiring a metric value related to the application 109. The host performance monitoring agent 112 acquires metric values related to the job server 106, OS 111, and ports 113 of the HBA 1065. The storage performance monitoring agent 304 acquires metric values related to the various types of resources (for example, the logical volumes 136 and ports 132) of the multi-tiered storage system 303 by way of the ports 1185 of the HBA 1183 and the ports 128 of the SAN switches 122. The SAN switch performance monitoring agent 117 acquires metric values related to the various resources (for example, the ports 127, 128 and 129) of the SAN switches 122. At least two from among the SAN performance monitoring software 305, storage performance monitoring agent 304, SAN switch performance monitoring agent 117, application performance monitoring agent 110, host performance monitoring agent 112, and hierarchy management software 307 can be executed by a different server, or by a single server. In other words, at least two from among the hierarchy management server 107, agent servers 116 and 118, and performance monitoring server 121 can be treated as a single server.

The multi-tiered storage system 303 has a controller 3031, and a plurality of storage devices 135.

The controller 3031 is a device for receiving an I/O command from the job server 106, and executing I/O relative to a logical volume specified from this I/O command. The controller 3031, for example, can be a circuit board comprising a port 132, CPU, and cache memory. With this CPU, for example, a migration execution unit 308 is executed as a computer program. The migration execution unit 308 executes a migration of data from a migration source volume 136 of the plurality of logical volumes 136 to a migration target volume 136 of the plurality of logical volumes 136.

A storage device 135 with a different attribute coexists with the plurality of storage devices 135. The attribute can be a major attribute, like a hard disk drive, DVD (Digital Versatile Disk) drive, or flash memory drive, or a minor attribute, like reliability, performance and/or price. That is, a storage device, which, for example, has a different major attribute and/or minor attribute, coexists with the plurality of storage devices 135. An array group (may also be called a RAID (Redundant Array of Independent (or Inexpensive) Disks) group) can be constituted from not less than two storage devices 135, and a logical volume 136 can be formed based on the storage space of the array group. Making the attributes of the not less than two storage devices 135, which constitute the array group, the same (for example, substantially the same) enables the attributes of the not less than two logical volumes 136 formed on the basis of this array group to be made the same as well. Which logical volume is assigned to which tier of a plurality of tiers can be determined on the basis of this attribute. For example, a logical volume formed on an array group constituted by high reliability storage devices 135 can be assigned to a high-level tier, and a logical volume formed on an array group constituted by low reliability storage devices 135 can be assigned to a low-level tier.

Figure 2:
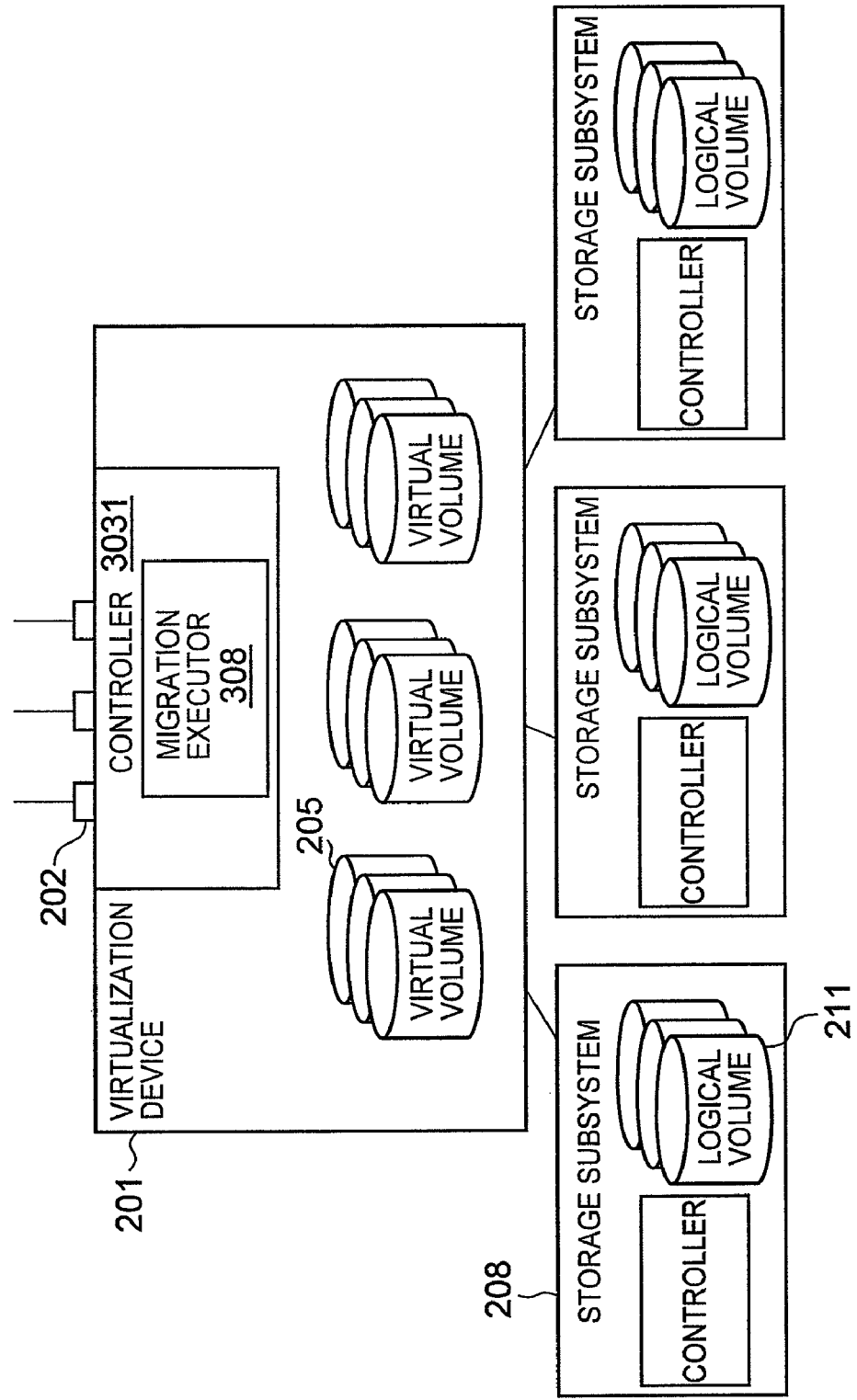
FIG. 2 shows a variation of the storage system in the system shown in FIG. 1.

A storage system, which is subjected to another mode of hierarchical management, can be used instead of the multi-tiered storage system 303. For example, instead of the multi-tiered storage system 303, the storage system illustrated in FIG. 2 can be employed. This storage system is constituted by a virtualization device 201, and a plurality of storage subsystems 208 with different attributes. One storage subsystem 208 comprises a plurality of storage devices, and this plurality of storage devices has the same attribute. In accordance with the virtualization function of the virtualization device 201, logical volumes 211, which reside in the plurality of storage subsystems 208, are provided to the job server 106 as virtual volumes 205 of the virtualization device 201. When the job server 106 accesses a virtual volume 205, the access is carried out to the logical volume 211 corresponding to this virtual volume 205. Different logical volumes 211 in different storage subsystems 208 are assigned to the respective tiers. For example, all the logical volumes 211 inside a first storage subsystem belong to the first tier, and all the logical volumes 211 inside a second storage subsystem belong to the second tier.

Figure 3:
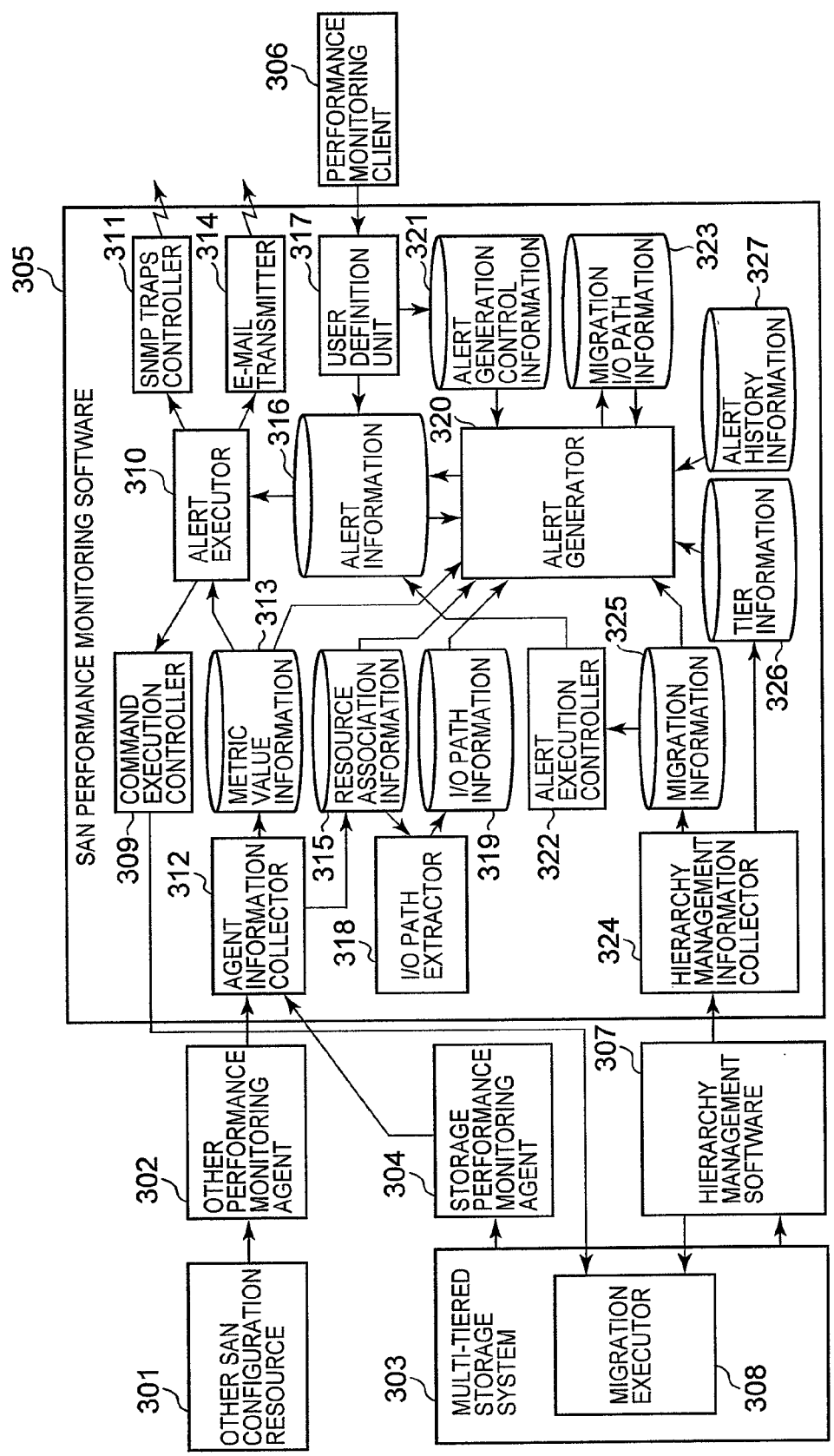
FIG. 3 shows an example of the configuration of SAN performance monitoring software.

FIG. 3 shows an example of the configuration of the SAN performance monitoring software 305.

The SAN performance monitoring software 305, as a program module, for example, has an agent information collector 312, I/O path extractor 318, hierarchical management information collector 324, command execution controller 309, alert execution controller 322, alert executor 310, alert generator 320, SNMP traps executor 311, e-mail transmission unit 314, and user definition unit 317. Further, the SAN performance monitoring software 305, as information comprising information elements to be referenced and/or updated (added, changed or deleted), for example, has metric value information 313, resource association information 315, I/O path information 319, migration information 325, tier information 326, alert history information 327, migration I/O path information 323, alert generation control information 321, and alert information 316.

The "other SAN configuration resource 301" shown in FIG. 3 is a resource (hardware or software) other than a resource related to the multi-tiered storage system 303 in the SAN. More specifically, the other SAN configuration resource 301, for example, is a job server 106 related resource (for example, an HBA 1065 port 113, application 109, OS 111) and SAN switch 122 related resource (for example, ports 127, 128, and 129).

Further, the "other performance monitoring agent 302" shown in FIG. 3 is software for acquiring configuration information and a metric value from the other SAN configuration resource 301. More specifically, the other performance monitoring software 302, for example, is an application performance monitoring agent 110, host performance monitoring agent 112, or SAN switch performance monitoring agent 117.

The monitoring of a metric value of a resource in the SAN is carried out as follows.

The other performance monitoring agent 302 and storage performance monitoring agent 304 are run using a prescribed method (for example, regularly run by a timer in accordance with a scheduling configuration, or run via a request from the SAN performance monitoring software 305), and acquire metric values from the monitoring-target resources for which they are responsible. The agent information collector 312 of the SAN performance monitoring software 305 is similarly run using a prescribed method (for example, regularly run in accordance with a scheduling configuration), acquires metric values from the respective performance monitoring agents 302 and 304, and registers same in the metric value information 313.

The alert execution unit 310 for the SAN performance monitoring software 305 monitors the metric value information 313, and if a metric value in the metric value information 313 matches a specific condition, executes a specific action. As the specific action, for example, there is an action for notifying a user via a prescribed method that a phenomenon has occurred in which a metric value matches a specific condition. As the notification method, for example, there are e-mail, SNMP traps, command execution, and so forth, and these respective methods are processed by the e-mail transmission unit 314, SNMP traps executor 311, and command execution controller 309. An alert definition, which is information expressing the definitions of an alert condition and an action method, is recorded in the alert information 316. As an alert definition recorded in the alert information 316, for example, there is a definition, which is inputted via the user definition unit 317 from a performance monitoring client 306 operated by a user, and a definition automatically generated by the alert generator 320.

The hierarchy management software 307 manages an information element recorded in the migration information 325, and an information element recorded in the tier information 326. The hierarchy management information collector 324 collects an information element recorded in the migration information 325, and an information element recorded in the tier information 326 from the hierarchy management software 307, and records the collected information elements in the migration information 325 and the tier information 326.

The alert execution controller 322 controls the validation and nullification of respective alert definitions recorded in the alert information 316.

The alert generator 320 automatically generates an alert definition corresponding to a migration target volume. Further, the alert generator 320 automatically generates, as a trial period alert definition, an alert definition comprising an alert condition, which is stricter than an alert condition used under normal processing (in other words, an alert condition, which strengthens monitoring). Furthermore, the alert generator 320 also automatically generates an alert definition for a migration period. The automatic generation of these alert definitions will be explained in detail hereinbelow.

The other performance monitoring agent 302 and storage performance monitoring agent 304 collect resource association information elements (for example, information elements expressing which port is correspondent to which port, or information elements expressing which port is correspondent to which logical volume), which are recorded in the resource association information 315 held by the job server 106, SAN switches 122 and multi-tiered storage system 303. The agent information collector 312 acquires the resource association information elements, which the other performance monitoring agent 302 and storage performance monitoring agent 304 collected, and records the acquired resource association information elements in the resource association information 315. The I/O path extractor 318 creates I/O path information 319 based on the resource association information 315, and stores same in the storage unit 1213 inside the performance monitoring server 121.

Figure 4:
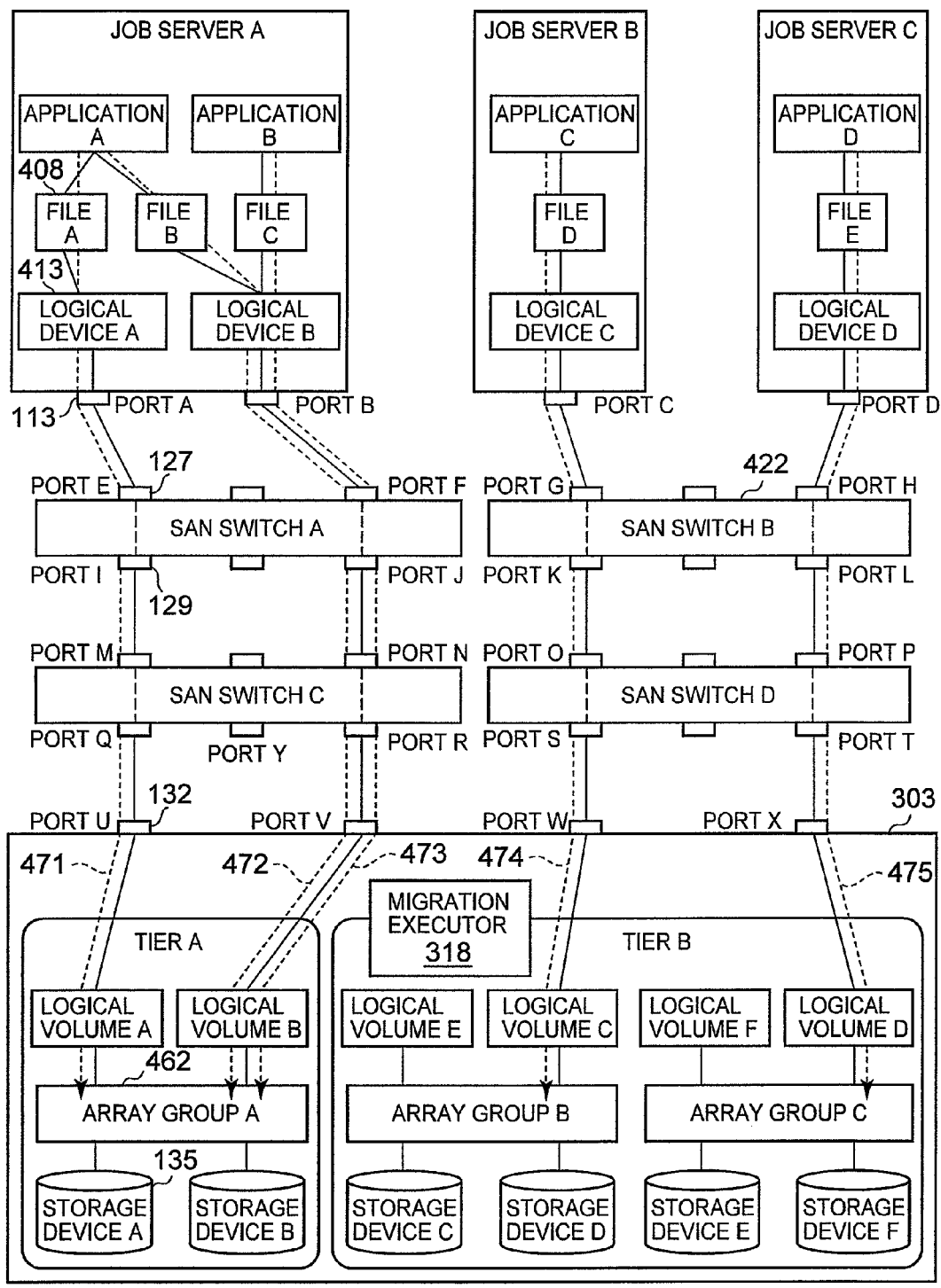
FIG. 4 shows an example of the configuration of an I/O path in a computer system.

FIG. 4 shows an example of the configuration of an I/O path in a computer system. Furthermore, in FIG. 4, the same type resources are distinguishably explained by appending a letter of the alphabet, such as A, B, C, ... to the resource name like a serial number.

In each job server 106, a file 408, which the application 109 accesses, is allocated to a logical device 413. The logical device 413 corresponds to a logical volume 136 inside the multi-tiered storage system 303. The file 408 is the unit via which the OS 111 provides data input-output services. The logical device 413 is managed by the OS as an area for storing a file 408 in an external storage device (in this embodiment, a logical volume 136 inside the multi-tiered storage system 303).

For example, in job server A, application A accesses file A and file B. File A is allocated to logical device A, and logical device A corresponds to logical volume A. File B is allocated to logical device B, and logical device B corresponds to logical volume B. Applications A and B are resources targeted for information acquisition by the application performance monitoring agent 110. Files A through C, logical devices A and B, and ports A and B are resources targeted for information acquisition by the host performance monitoring agent 112.

In FIG. 4, the solid lines connecting the resources signify performance dependence in that when the I/O load on the one resource increases, the I/O load on the other resource also increases. More specifically, for example, the solids lines connecting application A with files A and B represent a relationship in which application A issues an I/O command to file A as well as file B. Further, for example, the solid line connecting file A to logical device A represents a relationship in which the I/O load relative to file A becomes I/O (a write or read) of logical device A.

Further, in FIG. 4, the five dotted lines 471, 472, 473, 474 and 475, which have resources as either end points or relay points, respectively show I/O paths.

It is supposed that the storage performance monitoring agent 304 for acquiring metric values from resources in the multi-tiered storage system 303 is operating. The resources that this agent 304 targets for information acquisition are ports U through X, logical volumes A through D, array groups A through C, and storage devices A through F. In the example shown in the figure, logical volumes A and B belong to tier A, and these logical volumes A and B are formed on the basis of array group A, which is constituted by storage devices A and B. Further, logical volumes C through F belong to tier B, logical volumes C and E are formed on the basis of array group B, which is constituted by storage devices C and D, and logical volumes D and F are formed on the basis of array group C, which is constituted by storage devices E and F. Because logical device 413 inside job server 106 is allocated to logical volume 136, logical volume 136 is allocated to array group 462, and array group 462 is allocated to storage device 135, performance dependence exists among these resources. Further, once the pairing of logical device 413 and logical volume 136 is determined, the I/O path for data exchanged therebetween is determined as being from port 113 of HBA 1065 to port 132 of multi-tiered storage system 303 via ports 127 and 129 of the SAN switch. The I/O load placed on the logical device 413 inside job server 106 constitutes the communication I/O load on the respective ports belonging to the I/O path, and thus there is performance dependence between the paired logical device 413 and logical volume 136, and among the respective ports of the I/O path. In the example of FIG. 4, file A is allocated to logical device A, logical device A is allocated to logical volume A, logical volume A is allocated to array group A, array group A is allocated to storage devices A and B, and the pairing of logical device A and logical volume A corresponds to port A, port E, port I, port M, port Q, and port U. Thus, the nodes of I/O path 471 are application A, file A, logical device A, port A, port E, port I, port M, port Q, port U, logical volume A and array group A, and these nodes (that is, resources) are interlinked. According to I/O path 471, the I/O load of file A of application A impacts on storage devices A and B via I/O path 471, which is constituted from file A by logical device A, port A, port E, port I, port M, port Q, port U, logical volume A and array group A.

Figure 5:
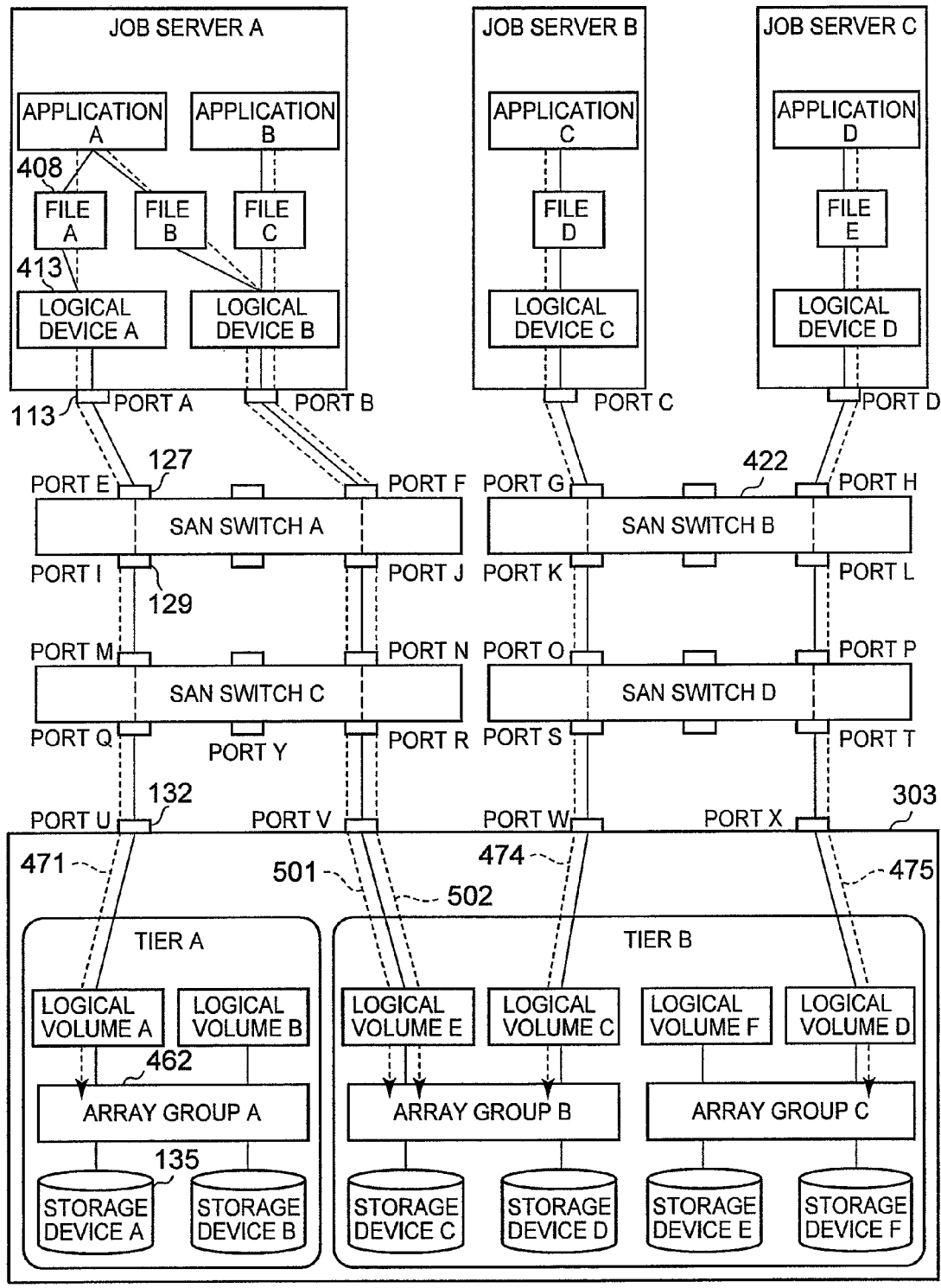
FIG. 5 shows the status subsequent to completing the migration of data from a logical volume B to a logical volume E in the computer system shown in FIG. 4.

FIG. 5 shows the status of the computer system shown in FIG. 4 subsequent to the end of a data migration from logical volume B to logical volume E.

When a migration is carried out from logical volume B to logical volume E, the internal path inside the multi-tiered storage system 303 (for example, port 132 connection target logical volume 136) is switched. More specifically, for example, in FIG. 4, the logical volume linked to port V was logical volume B, but due to the migration, since the data inside logical volume B resides in logical volume E, the connection target of port V is switched to logical volume E from logical volume B. As a result of this, I/O paths 472 and 473, which pass through port V and logical volume B in FIG. 4, are respectively switched as shown in FIG. 5 to I/O paths 501 and 502, which pass through port V and logical volume E (Furthermore, either instead of or in addition to switching the internal path as described above for I/O path switching, the changing of resources of either inside or outside the multi-tiered storage system 303 (for example, the changing of ports 127 and 129 in the SAN switch) can be carried out.).

The resources, which are affected performance-wise by I/O path switching like this (hereinafter path switching-affected resources), are the resources directly and indirectly belonging to I/O paths 472 and 473 that pass through logical volume B, and the resources directly and indirectly belonging to I/O paths 501 and 502 that pass through logical volume E. A resource, which directly belongs to an I/O path (hereinafter, called "target I/O path" for the sake of convenience), is a resource, which belongs to this target I/O path itself. A resource, which indirectly belongs to a target I/O path is a resource, which does not belong to this target I/O path itself, but rather belongs to another I/O path related to a resource belonging to this target I/O path. For example, when a first resource belongs to a first I/O path, this first resource also belongs to a second I/O path, a third resource belongs to the second I/O path, and the third resource also belongs to a third I/O path, if it is supposed that the first I/O path is the target I/O path, the first resource directly belongs to the first I/O path, and the second and third resources, indirectly belong to the first I/O path. As seen from the first I/O path, the logical distance between the first I/O path and the second I/O path is shorter than the logical distance between the first I/O path and the third I/O path. This is because the first I/O path is related to the second I/O path through the first resource only (in other words, the number of interposed I/O paths is zero), but the first I/O path is related to the third I/O path via the second resource of the second I/O path in addition to the first resource (in other words, because the number of interposed I/O paths is 1). Thus, the "logical distance" mentioned above can express the number of I/O paths interposed between the target I/O path.

In this embodiment, as will be explained hereinbelow, a resource affected by path switching is specified, and at the time of this specification, resources belonging directly and indirectly of the target I/O path are specified regardless of the logical distance to the target I/O path. Speaking in terms of FIGS. 4 and 5, to give one example, logical volume B and array group A, for which the I/O load is decreased by the migration, and logical volume E and array group B, for which I/O load is increased by the migration, and, in addition, application A, file A, logical device A, port A, port E, port I, port M, port Q, port U, logical volume A, file B, logical device B, port B, port F, port J, port N, port R, port V, application B, file C, logical volume E, array group B, application C, file D, logical device C, port C, port G, port K, port O, port S, port W, and logical volume C (that is, the resources belonging to I/O paths 471, 472, 473, 501, 502, and 474) become resources affected by path switching. Further, although not shown in the figure, for example, if I/O path 501 pass through port Y instead of port R, then port Y would also become a resource affected by path switching.

Figure 6:
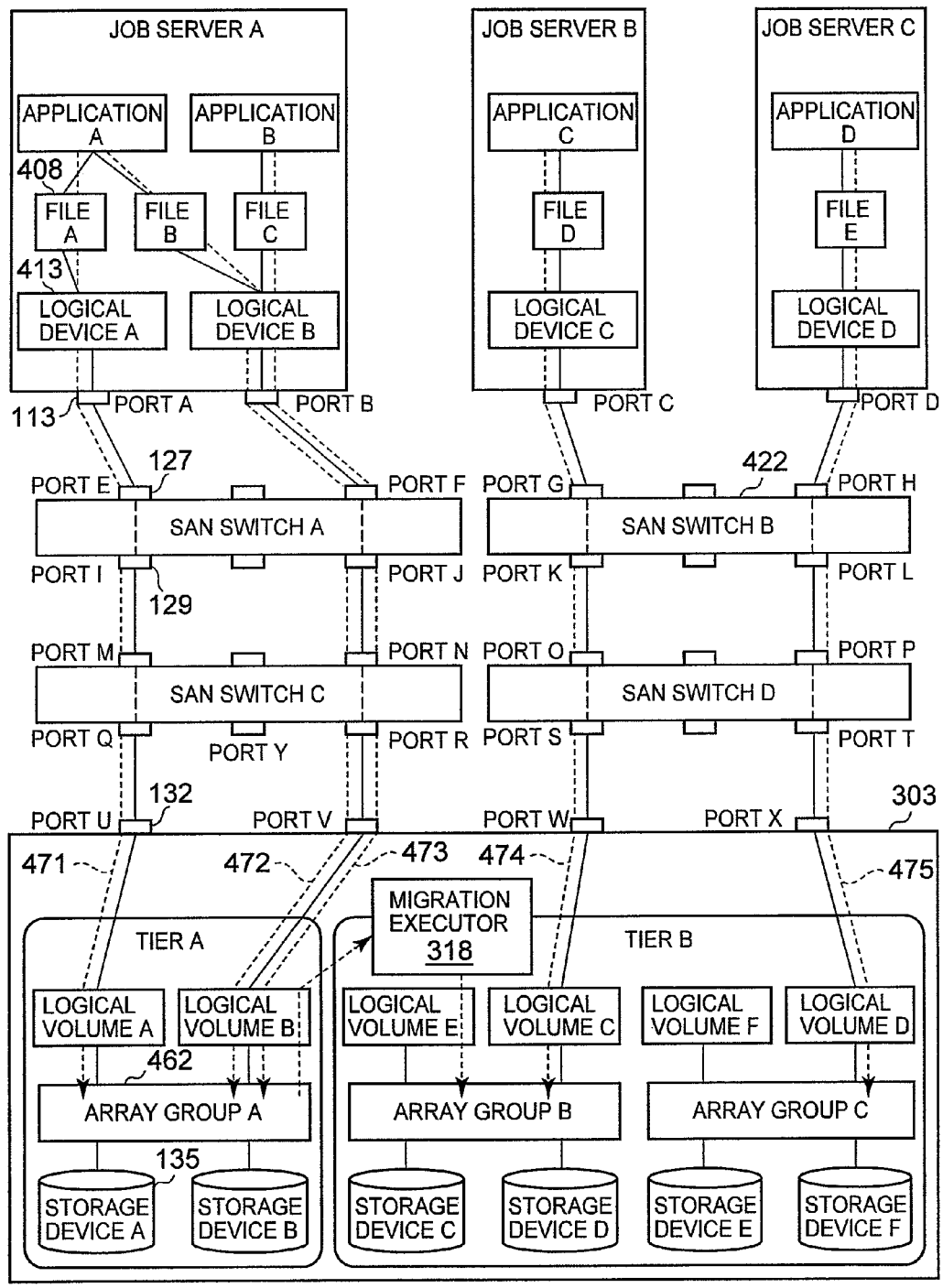
FIG. 6 shows the status in the midst of migrating data from a logical volume B to a logical volume E in the computer system shown in FIG. 4.

FIG. 6 shows the status of the computer system shown in FIG. 4 while a data migration is being carried out from logical volume B to logical volume E.

According to this FIG. 6, resources belonging to the migration I/O path are array group A, logical volume B, logical volume E and array group B. The I/O paths of these resources are I/O path 471, 472, 473 and 474. The resources that belong to these I/O paths 471, 472, 473 and 474 are resources (hereinafter, migration-period-affected resources), which are affected performance-wise during the migration period (that is, during migration execution). In this embodiment, these migration-period-affected resources are also specified.

Now then, the various types of information comprising information elements referenced and/or updated by the SAN performance monitoring software 305 will be explained hereinbelow.

FIG. 7 shows an example of the configuration of metric value information 313.

Metric value information 313, for example, is a table, and comprises metric values for the various types of metrics of the respective resources. More specifically, metric value information 313, for example, records for a single metric value a date/time 702, which is an information element expressing the date and time at which this metric value was collected; a resource identifier 703, which is the identifier of the collection-target resource of this metric value; a metric identifier 704, which is the identifier of the metric corresponding to this metric value; and a metric value 705, which is the collected metric value.

FIGS. 8 through 12 show information comprising resource association information 315. More specifically, resource association information 315 comprises application-file association information 801 (Refer to FIG. 8); file-logical device association information 901 (Refer to FIG. 9); logical volume-array group association information 1001 (Refer to FIG. 10); logical volume information 1101 (Refer to FIG. 11); and logical device-logical volume-port correspondence information 1201 (Refer to FIG. 12). The information elements recorded in this information 801, 901, 1001, 1101, 1201 are collected by the agent information collector 312, and are recorded in information 801, 901, 1001, 1101, and 1201.

As shown in FIG. 8, application-file association information 801, for example, is a table, and is information expressing the dependence between application 109 and a file 408. More specifically, for example, application-file association information 801 records an application identifier 802 and a file identifier 803 group for a single combination of application 109 and a file 408.

As shown in FIG. 9, file-logical device association information 901, for example, is a table, and is information expressing the dependence between a file 408 and a logical device 413. More specifically, for example, file-logical device association information 901 records a file identifier 902 and a logical device identifier 903 group for a single combination of a file 408 and a logical device 413.

As shown in FIG. 10, logical volume-array group association information 1001, for example, is a table, and is information expressing the dependence between a logical volume 136 and an array group 462. More specifically, for example, logical volume-array group association information 1001 records a logical volume identifier 1002 and an array group identifier 1003 group for a single combination of a logical volume 136 and an array group 462.

As shown in FIG. 11, logical volume information 1101, for example, is a table, and is information expressing a combination of a logical volume 136 identifier and number. Logical volume information 1101, for example, records a logical volume identifier 1102 and a logical volume number 1103 for a single logical volume 136. A logical volume identifier 1102 for a logical volume 136 is constant, but a logical volume number 1103 changes in accordance with a migration being executed. For example, when data is migrated from logical volume B to logical volume E as in the example given above, and the logical volume number 1103 of logical volume B is "02", and the logical volume number 1103 of logical volume E is "05", the logical volume number 1103 of logical volume E is changed from "05" to "02". Thus, the logical volume number 1103 can also be deemed as a number for identifying the data inside a logical volume 136.

As shown in FIG. 12, logical device-logical volume-port correspondence information 1201, for example, is a table, and is information expressing the correspondence among a logical device 413, logical volume 136 and ports. More specifically, for example, logical device-logical volume-port correspondence information 1201 records for a single correspondence, a logical device identifier 1202; logical volume identifier 1203; port identifier 1204, which is the identifier of a port 113 in the HBA 1065; a port identifier 1205, which is the identifier of a port 132 in the multi-tiered storage system 303; and a port identifier/order 1206, which is the identifier of the ports 127, 129 in the SAN switch 122, and the arrangement thereof along the I/O path.

FIG. 13 shows an example of the configuration of I/O path information 319.

I/O path information 319, for example, is a table, and is information expressing the corresponding relationship between an I/O path and the resources belonging thereto. More specifically, for example, I/O path information 319 records for a single resource a resource identifier 1303; and a path identifier 1302, which is the identifier of the I/O path to which this resource belongs. The corresponding relationship between an I/O path and the resources belong thereto is specified by the I/O path extractor 318 based on resource association information 315, and this I/O path information 319, which expresses a specified corresponding relationship, is stored in a storage unit 1213.

FIG. 14 shows an example of the configuration of tier information 326.

Tier information 326, for example, is a table, and is information expressing the corresponding relationship between a tier and the logical volumes belonging thereto. More specifically, for example, tier information 326 records for a single logical volume a logical volume identifier 1403; and a tier identifier 1402, which is the identifier of the tier to which this logical volume belongs. This tier information 326 is generated by the hierarchy management information collector 324 based on information acquired from the hierarchy management software 307 (for example, information expressing which logical volume belongs to which tier), and is stored in a storage unit 1213.

FIG. 15 shows an example of the configuration of migration information 325.

Migration information 325, for example, is a table, and expresses information related to a migration. More specifically, for example, migration information 325 records for a single migration a migration identifier 1502; a migration source volume number 1503; a migration target volume number 1504; a migration status 1505, which is information expressing the status related to a migration; and a migration end date/time 1506, which is information expressing the date and time at which a migration ends. As values of the migration status 1505, for example, there are the following five types: "waiting", which expresses the fact that it is prior to the execution of a migration; "executing", which means that a migration is in the process of being executed; "temporarily suspended", which signifies that migration execution had commenced but has been temporarily suspended; "complete", which means that a migration has ended; and "cancelled", which signifies that migration was started, but that this migration was terminated part way through.

The hierarchy management software 307, for example, sends information comprising a migration source volume number and a migration target volume number to the hierarchy management information collector 324. The hierarchy management information collector 324 adds the collected information to the migration information 325. The alert generator 320 respectively generates alert definitions for a migration target volume, a trial period and a migration period for a migration corresponding to this added information. The hierarchy management software 307 can commence this migration in the migration execution unit 308 subsequent to these alert definitions being generated for this migration.

Further, the hierarchy management software 307 notifies the migration status (for example, waiting, executing or complete) to the hierarchy management information collector 324. The hierarchy management information collector 324 updates the migration status 1505 in the migration information 325 to the notified migration status.

FIG. 16 shows an example of the configuration of migration I/O path information 323.

Migration I/O path information 323, for example, is a table, and is information expressing the resources belonging to a migration I/O path. More specifically, for example, migration I/O path information 323 records a migration path identifier 1602, which is the identifier of a migration I/O path; an identifier 1603 of a migration during which data passes through this migration I/O path; and an identifier 1604 of a resource, which belongs to this migration I/O path. For example, the alert generator 320 can generated this migration I/O path information 323 based on migration information 325 and I/O path information 319, and can store same in a storage unit 1213.

In this migration I/O path information 323, for example, for the same type of resource identifier 1604 in the same migration identifier 1603 range, the upper side resource identifier (for example, "logical volume B") is the migration source resource, and the lower side resource identifier (for example, "logical volume E") is the migration target resource. Information elements expressing a migration source and a migration target can be appended to the migration I/O path information 323. Or, the migration source resource and migration target resource can be determined from the migration information 325 instead.

FIG. 17 shows an example of the configuration of alert information 316.

Alert information 316, for example, is a table, and is information expressing what alert definition is correspondent to which resource. For example, alert information 316 records for a single resource the alert type 1702, which is information expressing the type of alert; a migration identifier 1703 related to this resource; a resource identifier 1704; an identifier 1705 of a metric for this resource; a threshold 1706; an evaluation interval 1707; an action type 1708, which is information expressing the type of action; an action parameter 1709; an alert status 1710, which is information expressing the status of an alert; and a last evaluation date/time 1711, which is information expressing the date and time of the last evaluation.

As alert type 1702 values there are "trial period" and "migration period" in addition to the "normal processing" shown in the figure. The migration identifier 1703 value is entered when the alert type 1702 value is "trial period" or "migration period".

An alert condition within an alert definition, for example, is expressed by the threshold 1706 and evaluation interval 1707. The threshold 1706 is compared against a collected metric value. The evaluation interval 1707 is the interval of evaluation time when a collected metric value is not less than (or not more than) the threshold 1706. When the interval from the last evaluation date/time 1711 until the current date/time is less than the evaluation interval 1707, an evaluation is not carried out.

An action method within an alert definition is expressed by the action type 1708 and the action parameter 1709. The value of the action parameter 1709 is a value corresponding to the value of the action type 1708 (For example, if the action type 1708 value is "e-mail", the action parameter 1709 value is configured as e-mail address.)

FIG. 18 shows an example of the configuration of alert history information 327.

Alert history information 327, for example, is a table, and is information expressing the history of information related to the migration source volume in a past migration. More specifically, for example, alert history information 327 records for a single migration a logical volume number 1802 of a migration source volume; a logical volume identifier 1803 of the migration source volume; a metric identifier 1804, which is correspondent to a migration source volume; a threshold 1805; an evaluation interval 1806; an action type 1807; and an action parameter 1808.

For example, during a migration period, or subsequent to migration end, the alert generator 320 specifies from the logical volume information 1101 the logical volume number 1103 corresponding to the migration source volume in this migration, specifies from the alert information 316 the metric identifier 1705, threshold 1706, evaluation interval 1707, action type 1708, and action parameter 1709 corresponding to this migration source volume, and records the logical volume identifier, specified logical volume number, metric identifier, threshold, evaluation interval, action type and action parameter of the migration source volume in the alert history information 327.

FIG. 19 shows an example of the configuration of alert generation control information 321.

Alert generation control information 321 is information for controlling the generation of an alert definition, and, for example, is information prepared in advance. More specifically, for example, in alert generation control information 321, there is recorded a trial period 1902, which is information expressing the length of a trial period from the time a migration ends; an evaluation interval 1903 for a trial period; an evaluation interval 1904 for a migration period; and a threshold [P23,L1]acceptance rate 1905 for a migration period. The threshold acceptance rate 1905 is used in computations for calculating a new threshold based on the threshold 1706 recorded in the alert information 316.

The flow of processing carried out in this embodiment will be explained hereinbelow. Furthermore, in the following explanation, the information element group recorded in each row of table-formatted information will be called a "record".

Figure 20:
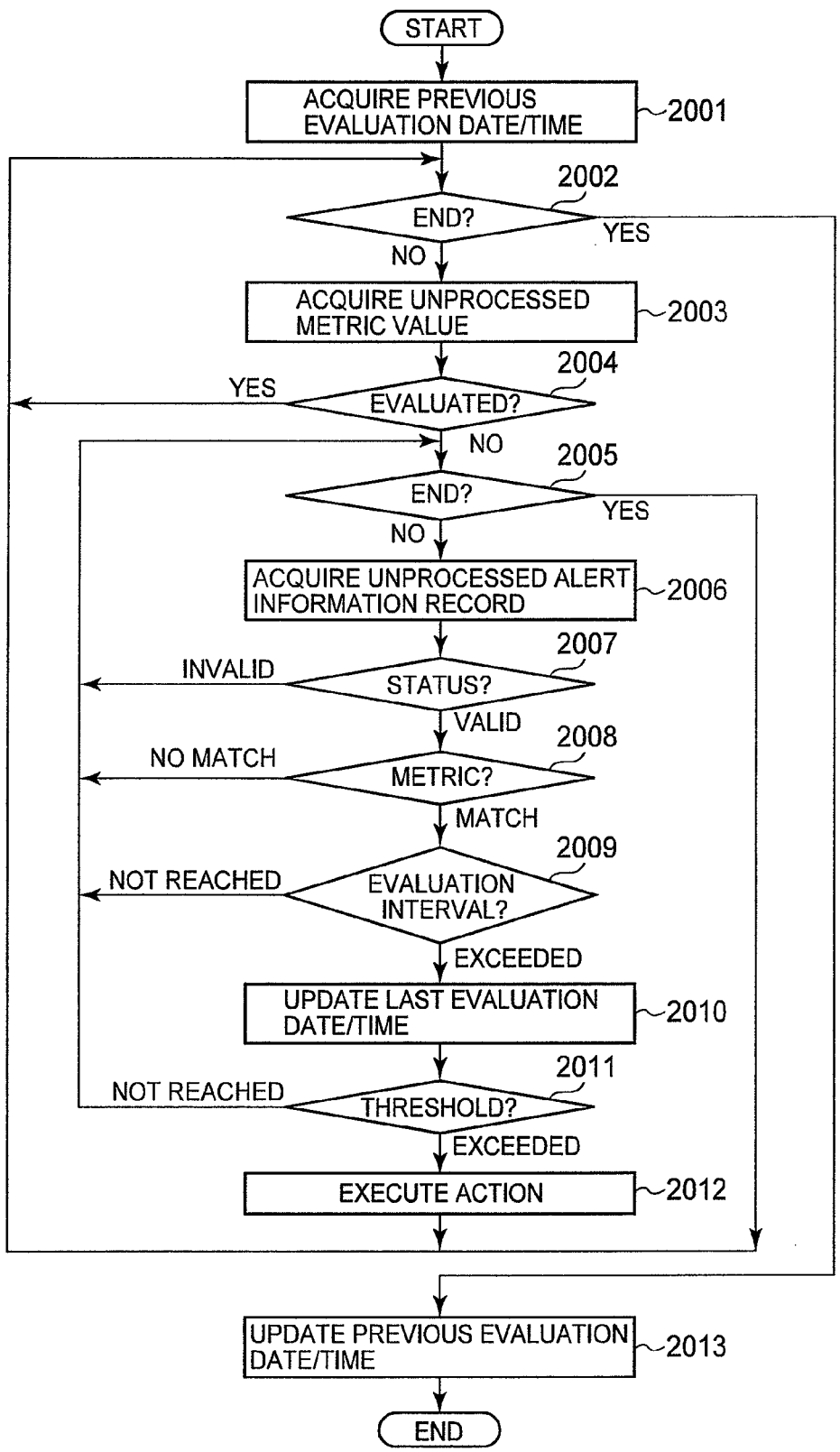
FIG. 20 is a flowchart of an evaluation/execution process carried out by an alert executor.

FIG. 20 is a flowchart of the evaluation/execution process carried out by the alert executor 310. This evaluation/execution process, for example, is run regularly using a timer in accordance with a scheduling configuration.

In Step 2001, the alert executor 310 acquires information expressing the date and time that the evaluation/execution process was executed immediately prior to this (hereinafter, called "previous evaluation date/time information"). The previous evaluation date/time information, for example, is stored in a storage unit 1213 (for example, a memory).

In Step 2002, the alert executor 310 determines whether or not there are unprocessed metric values in the metric value information 313 of the current evaluation/execution process. If there are no unprocessed metric values, the alert executor 310 moves to Step 2013, and if there are unprocessed metric values, the alert executor 310 moves to Step 2003.

In Step 2003, the alert executor 310 acquires one unprocessed metric value 705 from the metric value information 313 in the current evaluation/execution process.

In Step 2004, the alert executor 310 determines whether or not the value of the date/time 702 corresponding to the acquired metric value 705 is older than the previous evaluation date/time expressed by the previous evaluation date/time information. If the date/time 702 is older than the previous evaluation date/time, this metric value 705 was evaluated in an evaluation/execution process of prior to the previous evaluation/execution process, and as such, the alert executor 310 returns to Step 2002. If it is not older, then this metric value 705 has yet to be evaluated, and the alert executor 310 proceeds to Step 2005.

In Step 2005, the alert executor 310 determines whether or not there are unprocessed records in the alert information 316 of the current evaluation/execution process. If there are unprocessed records, the alert executor 310 proceeds to Step 2006, and if there are no unprocessed records, the alert executor 310 returns to Step 2002.

In Step 2006, the alert executor 310 acquires one unprocessed record (hereinafter, alert information record) from the alert information 316 in the current evaluation/execution process.

In Step 2007, the alert executor 310 determines if the value of the alert status 1710 of the alert information record acquired in Step 2006 is "valid" or "invalid". If the value of the alert status 1710 is "invalid", the alert executor 310 returns to Step 2005, and if the value of the alert status 1710 is "valid", the alert executor 310 proceeds to Step 2008.

In Step 2008, the alert executor 310 compares the resource identifier 1704 and metric identifier 1705 in the alert information record acquired in Step 2006 against the resource identifier 703 and metric identifier 704 corresponding to the metric value 705 acquired in Step 2003. If these identifiers match, the alert executor 310 proceeds to Step 2009, and if the identifiers do not match, the alert executor 310 returns to Step 2005.

In Step 2009, the alert executor 310 determines whether or not the difference between the current date/time and the date/time expressed by the last evaluation date/time 1711 in the alert information record acquired in Step 2006 is larger than the value expressed by the evaluation interval 1707 in this alert information record. If this difference is not larger than the evaluation interval value, this means that the time expressed by the evaluation interval 1707 has not elapsed from the date/time expressed by this last evaluation date/time 1711, and the alert executor 310 returns to Step 2005, but if this difference is larger than the evaluation interval value, the alert executor 310 proceeds to Step 2010.

In Step 2010, the alert executor 310 updates the last evaluation date/time 1711 in the alert information record acquired in Step 2006 to the information expressing the current date and time.

In Step 2011, the alert executor 310 determines whether or not the metric value 705 acquired in Step 2003 exceeds the threshold 1706 in the alert information record acquired in Step 2006. If the metric value 705 exceeds the threshold 1706, this means the alert condition has been met, and the alert executor 310 proceeds to Step 2012. If the metric value does not exceed the threshold 1706, this means the alert condition has not been met, and the alert executor 310 returns to Step 2005.

In Step 2012, the alert executor 310 executes an action in accordance with the action type 1708 and action parameter 1709 in the alert information record acquired in Step 2006 by invoking the processors (309, 311, 314) in accordance with this action type 1708 and action parameter 1709.

In Step 2013, the alert executor 310 updates the previous evaluation date/time information to the information expressing the current date and time.

Figure 21:
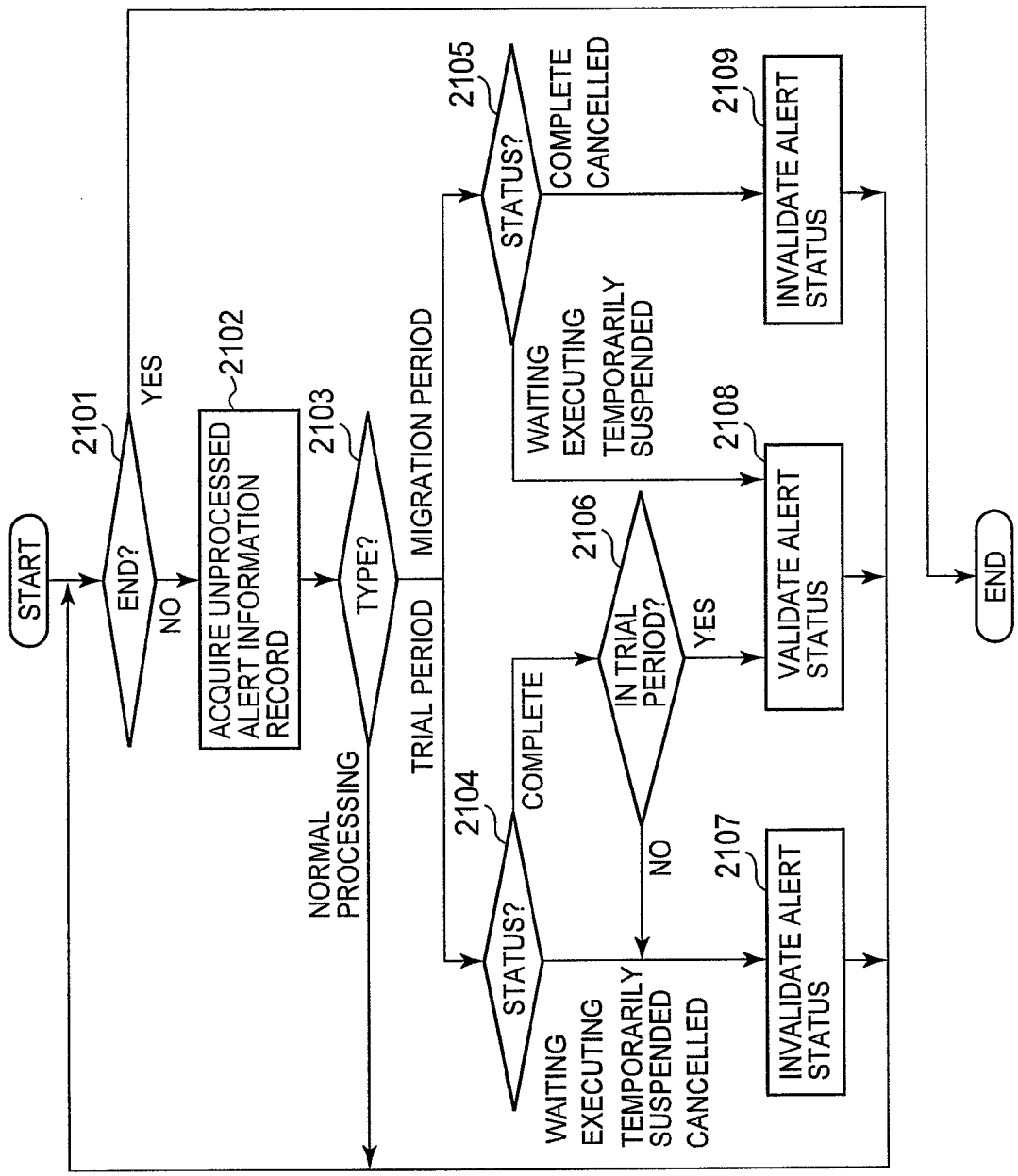
FIG. 21 is a flowchart of an alert execution control process carried out by an alert execution controller.

FIG. 21 is a flowchart of an alert execution control process carried out by the alert execution controller 322. This alert execution control process, for example, is run regularly using a timer or the like in accordance with a scheduling configuration. Furthermore, the time interval during which the alert execution control process is run is shorter than the time interval during which the above-described evaluation/execution process is run.

In Step 2101, the alert execution controller 322 determines whether or not a record, which was not processed in the current alert execution control process (hereinafter, alert information record), is in the alert information 316. If an unprocessed record exists, the alert execution controller 322 proceeds to Step 2102, and if there is no unprocessed record, processing ends.

In Step 2102, the alert execution controller 322 acquires the unprocessed alert information record.

In Step 2103, the alert execution controller 322 references the alert type 1702 in the alert information records acquired in Step 2102. If the alert type 1702 value is "normal processing", the alert execution controller 322 returns to Step 2101, if the alert type 1702 value is "trial period", the alert execution controller 322 proceeds to Step 2104, and if the alert type 1702 value is "migration period", the alert execution controller 322 proceeds to Step 2105.

In Step 2104, the alert execution controller 322 references the migration status 1505 in the migration information 325, which corresponds to the migration identified from the migration identifier 1703 in the alert information record acquired in Step 2102. If the value of the migration status 1505 is "waiting", "executing", "temporarily suspended", or "cancelled", the alert execution controller 322 moves to Step 2107, but if the value of the migration status 1505 is "complete", the alert execution controller 322 moves to Step 2106.

In Step 2105, the alert execution controller 322 references the migration status 1505 in the migration information 325, which corresponds to the migration identified from the migration identifier 1703 in the alert information record acquired in Step 2102. If the value of the migration status 1505 is "waiting", "executing", or "temporarily suspended", the alert execution controller 322 moves to Step 2108, but if the value of the migration status 1505 is "complete" or "cancelled", the alert execution controller 322 moves to Step 2109.

In Step 2106, the alert execution controller 322 references the migration end date/time 1506 in the migration information 325, which corresponds to the migration specified in Step 2104, and the trial period 1902 in the alert generation control information 321. If the difference between the current date and time and the date and time expressed by the migration end date/time 1506 is less than the period expressed by the trial period 1902, this means the current date and time is a date/time within the trial period, and the alert execution controller 322 proceeds to Step 2108. By contrast, if the above-mentioned difference exceeds the period expressed by the trial period 1902, this means the current date and time exceeds the trial period, and is a normal processing date/time, and the alert execution controller 322 proceeds to Step 2107.

In Steps 2107 and 2109, the alert execution controller 322 configures the value of the alert status 1710 in the alert information record acquired in Step 2102 to "invalid".

In Step 2108, the alert execution controller 322 configures the value of the alert status 1710 in the alert information record acquired in Step 2102 to "valid".

Figure 22:
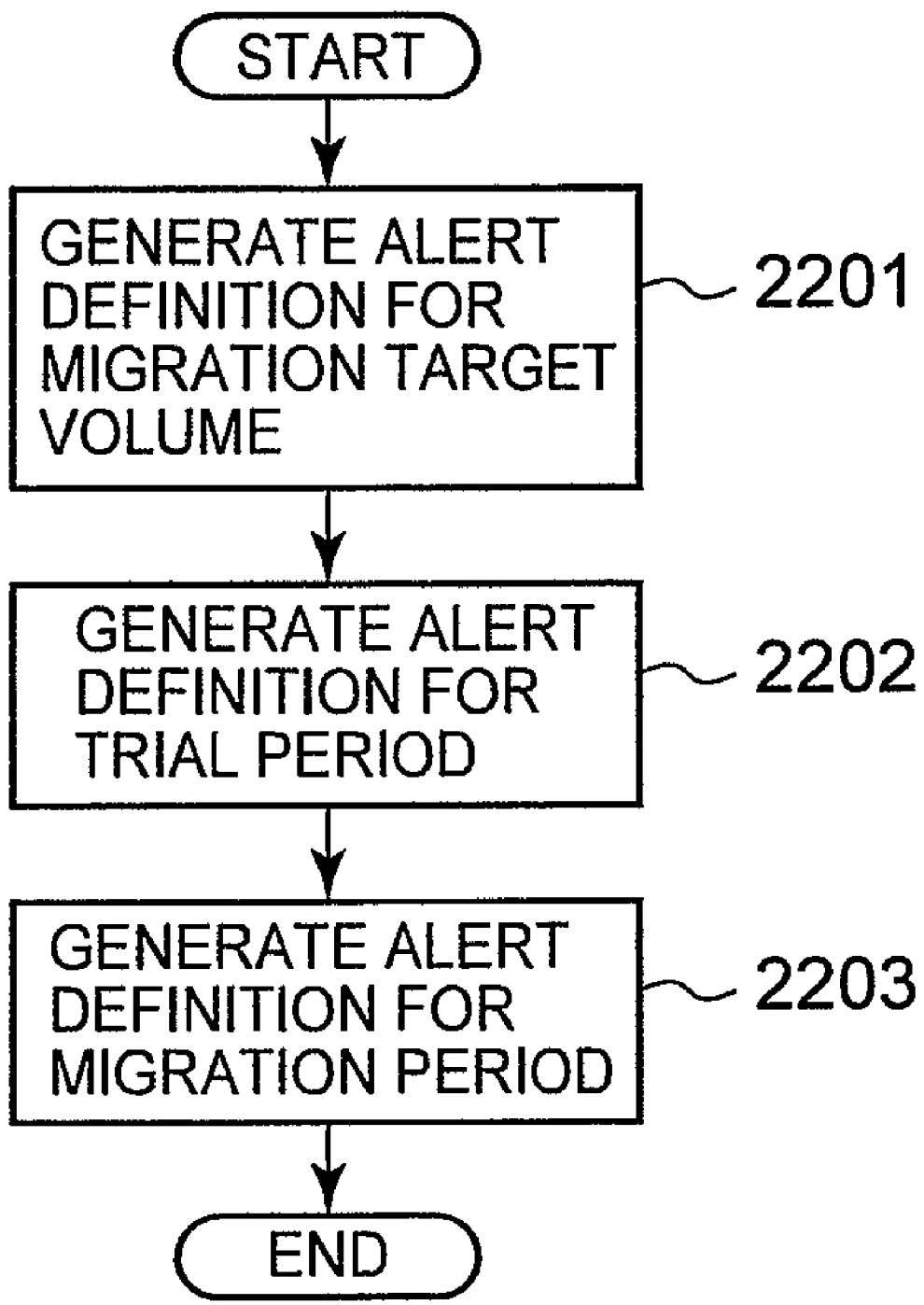
FIG. 22 is a flowchart of an alert generation process carried out by an alert generation unit.

FIG. 22 is a flowchart of an alert generation process carried out by the alert generator 320. The alert generation process, for example, is run at a timing, which registers an information element related to a new migration acquired by the hierarchy management information collector 324 from the hierarchy management software 307 (hereinafter, migration information element), in the migration information 325.

In Step 2201, the alert generator 320 generates an alert definition for a migration target volume.

In Step 2202, the alert generator 320 generates an alert definition for a trial period.

In Step 2203, the alert generator 320 generates an alert definition for a migration period.

Furthermore, if the alert generator 320 has finished up to Step 2203 for a certain migration, the alert generator 320 can notify the hierarchy management software 307 of the identifier of this migration. The hierarchy management software 307 configures the status of this certain migration to "waiting", and upon receiving the identifier of this certain migration from the alert generator 320, can execute the migration corresponding to this identifier via the migration executor 308.

Figure 23:
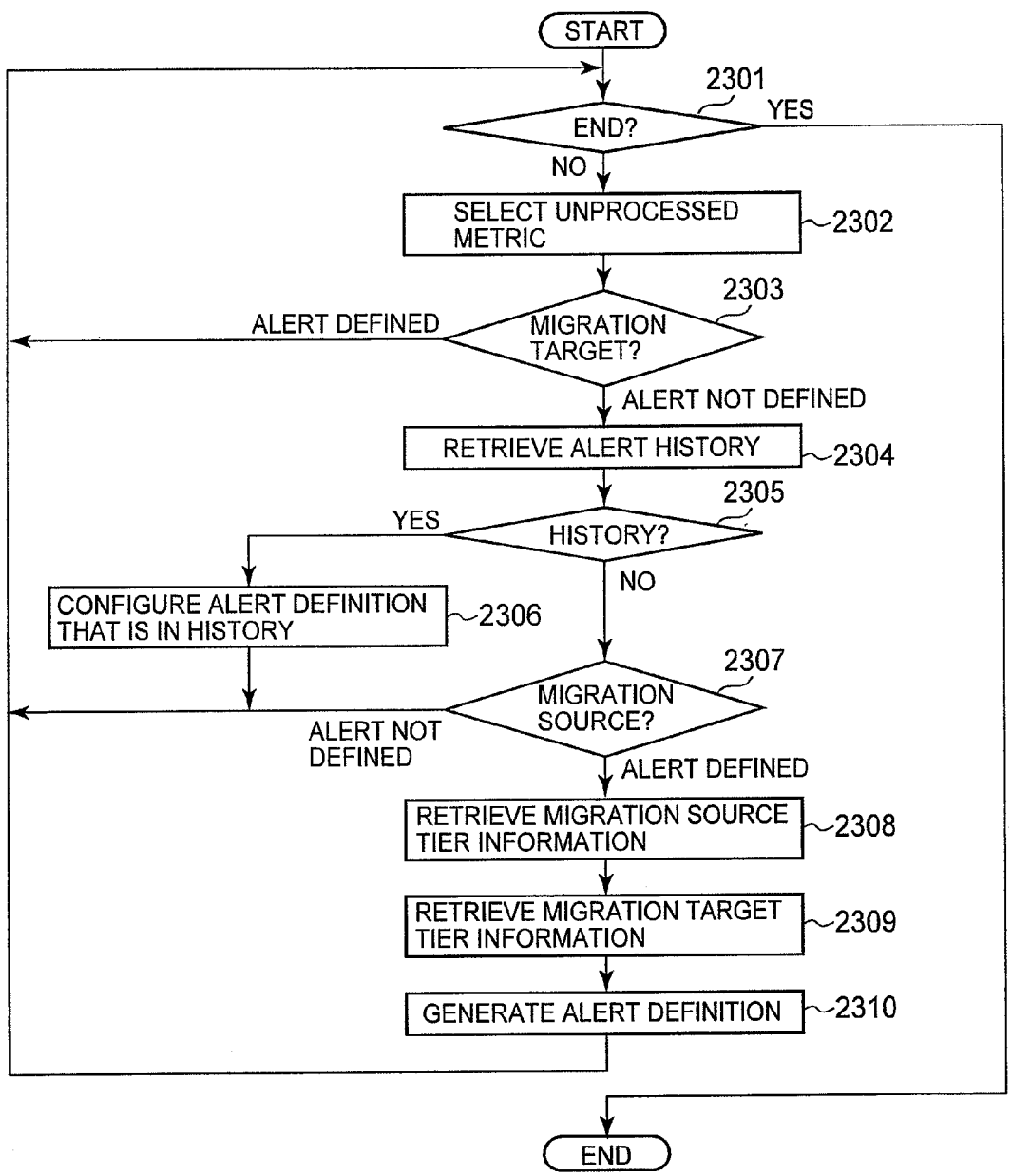
FIG. 23 is a flowchart of the processing in Step 2201 of FIG. 22.

FIG. 23 is a flowchart of the processing in Step 2201 of FIG. 22 (the alert definition generation process for the migration target volume).

In Step 2301, the alert generator 320 determines whether or not, of all the metrics that a logical volume possesses, there is a metric that was not processed in the alert definition generation process for the current migration target volume. The identifier of a metric of a logical volume can be acquired from the metric value information 313. If there is no unprocessed metric, processing ends, but if there is an unprocessed metric, the alert generator 320 proceeds to Step 2302.

In Step 2302, the alert generator 320 acquires the identifier of one metric, which, from among all the metrics of a logical volume, was not processed in the alert definition generation process for the current migration target volume.

In Step 2303, the alert generator 320 specifies from the migration target volume number 1504 inside the record, which corresponds to a migration information element (a record in the migration information 325), the number of a migration target logical volume comprising this migration information element acquired by the hierarchy management information collector 324 at the timing at which the alert definition generation process for the current migration target volume was run. The alert generator 320 uses this specified logical volume number to reference the logical volume information 1101, and acquires the logical volume identifier corresponding to this logical volume number. Furthermore, the alert generator 320 uses this logical volume identifier and the metric identifier acquired in Step 2302, and, on the condition that the alert type 1702 is "normal processing", references the alert information 316, and determines whether or not the pertinent alert information record exists. If the pertinent alert information record exists, this means that an alert definition was generated for the pertinent metric of the migration target volume (the metric identified from the metric identifier acquired in Step 2302), and the alert generator 320 returns to Step 2301, and if the pertinent alert information record does not exist, the alert generator 320 proceeds to Step 2304.

In Step 2304, the alert generator 320 retrieves from the alert history information 327 a record, which expresses a combination of the migration source logical volume number (the number specified from the migration source volume number 1503 in the record (migration information 325 record) corresponding to the migration information element acquired by the hierarchy management information collector 324 at the timing at which the alert definition generation process for the current migration target volume was run), the logical volume identifier the migration target volume specified in Step 2303, and the metric identifier acquired in Step 2302. If such a record exists, this means that the migration target volume was the migration source volume in the past (More specifically, for example, this signifies that this migration target volume was a migration source volume in the past, and that the migrated data is finally being returned having itself as the migration target.). Thus, if such a record is discovered (Step 2305: "YES") the alert generator 320 moves to Step 2306. By contrast, if such a record is not discovered (Step 2305: "NO"), the alert generator 320 proceeds to Step 2307.

In Step 2306, the alert generator 320 records in the alert information 316 as an alert definition the threshold 1805, evaluation interval 1806, action type 1807, and action parameter 1808 in the discovered record. Consequently, the correspondent alert definition when the volume was the migration source volume becomes correspondent to the migration target volume.

In Step 2307, the alert generator 320 uses the identifier for the migration source volume (the logical volume identifier, which corresponds to the above-mentioned number (migration source volume number) specified from the migration source volume number 1503, and which was specified from the logical volume information 1101 using this number), and the metric identifier acquired in Step 2302, and, on the condition that the alert type 1702 is "normal processing", references the alert information 316, and determines whether or not the pertinent alert information record exists. If the pertinent alert information record exists, this means that an alert has been defined for the pertinent metric of the migration source volume (the metric identified from the metric identifier acquired in Step 2302), and the alert generator 320 proceeds to Step 2308, and if the pertinent alert information record does not exist, the alert generator 320 returns to Step 2301.

In Step 2308, the alert generator 320 specifies from the tier information 326 all the logical volumes belonging to the tier to which the migration source volume belongs (migration source tier), and respectively acquires from the metric value information 313 as well as the alert information 316 the metric values 705, thresholds 1706, and evaluation intervals 1707 for all these logical volumes.

In Step 2309, the alert generator 320 specifies from the tier information 326 all the logical volumes belonging to the tier to which the migration target volume belongs (migration target tier), and respectively acquires from the metric value information 313 as well as the alert information 316 the metric values 705, thresholds 1706, and evaluation intervals 1707 for all these logical volumes.

In Step 2310, the alert generator 320 generates an alert definition for the migration target volume.

More specifically, for example, the action type 1708 and action parameter 1709 of the migration target volume are made the same as the action type 1708 and action parameter 1709 in the alert definition of the migration source volume (the alert definition acquired from the alert information record specified in Step 2307).

Further, for example, the threshold 1706 of the migration target volume is computed based on the threshold 1706 of the migration source volume, the metric values of the respective logical volumes belonging to the migration target tier (metric values 705 acquired in Step 2309), and metric values of the respective logical volumes belonging to the migration source tier (metric values 705 acquired in Step 2308). More specifically, for example, the threshold 1706 value is computed using the following Equation (1).

$$\begin{aligned}&\text{Migration target volume threshold 1706}\\&\quad\text{value=migration source volume threshold 1706}\\&\quad\text{value} \times (\text{average of metric values of logical vol-}\\&\quad\text{umes belonging to migration target tier} \div \text{average}\\&\quad\text{of metric values of logical volumes belonging to}\\&\quad\text{migration source tier})\end{aligned} \quad (1)$$

Further, for example, the evaluation interval 1707 of the migration target volume is computed based on the value of the evaluation interval 1707 of the migration source volume, the values of the evaluation intervals 1707 of the respective logical volumes belonging to the migration target tier, and values of the evaluation intervals 1707 of the respective logical volumes belonging to the migration source tier (or, simply the values of the evaluation intervals 1707 of the respective logical volumes belonging to the migration target tier). More specifically, for example, the evaluation interval 1707 value is computed using the following either Equation (2) or Equation (3).

$$\begin{aligned}&\text{Migration target volume evaluation interval 1707}\\&\quad\text{value=migration source volume evaluation inter-}\\&\quad\text{val 1707 value} \times (\text{average value of evaluation}\\&\quad\text{intervals 1707 of one or more logical volumes}\\&\quad\text{belonging to migration target tier average value}\\&\quad\text{of evaluation intervals 1707 of one or more logi-}\\&\quad\text{cal volumes belonging to migration source tier})\end{aligned} \quad (2)$$

$$\begin{aligned}&\text{Migration target volume evaluation interval 1707}\\&\quad\text{value=average value of evaluation intervals 1707}\\&\quad\text{of one or more logical volumes belonging to}\\&\quad\text{migration target tier}\end{aligned} \quad (3)$$

According to this alert definition generation process, the alert condition of the migration target volume is generated automatically based on the metric value and/or alert condition of a logical volume belonging to the migration target tier (or, in addition thereto, on the metric value and/or alert condition of a logical volume belonging to the migration source tier). Further, an alert definition comprising this alert condition is automatically validated by the process explained using FIG. 21. Consequently, the performance of the migration target volume can be monitored using an appropriate condition, and an alert definition configuration omission can be prevented for the migration target volume.

Figure 24:
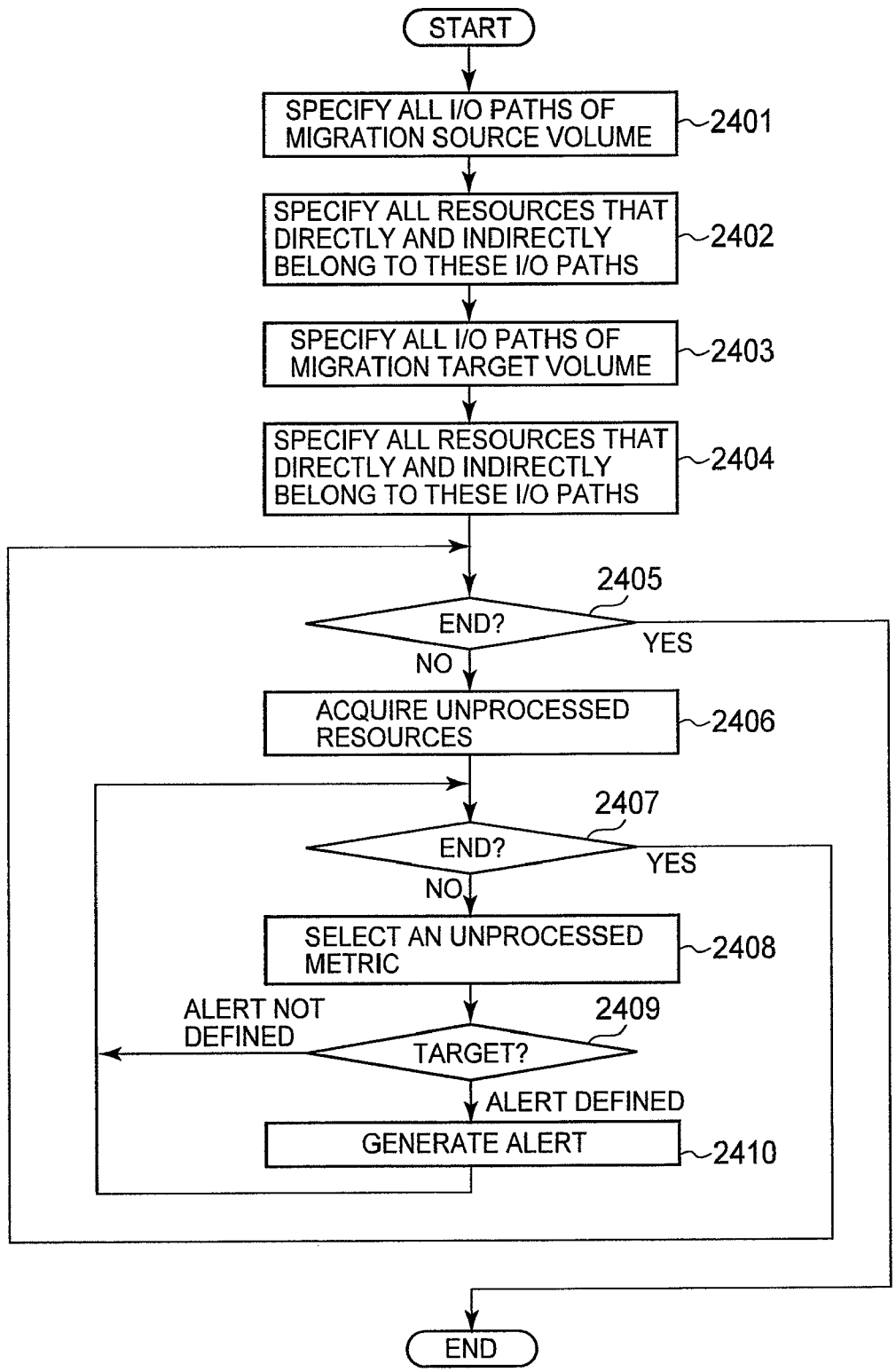
FIG. 24 is a flowchart of the processing in Step 2202 of FIG. 22.

FIG. 24 is a flowchart of the processing in Step 2202 of FIG. 22 (the alert definition generation process for a trial period).

In Step 2401, the alert generator 320 specifies from the I/O path information 319 all the I/O paths of the migration source volume.

In Step 2402, the alert generator 320 specifies from the I/O path information 319 all the resources directly and indirectly belonging to all of the I/O paths specified in Step 2401.

In Step 2403, the alert generator 320 specifies from the I/O path information 319 all the I/O paths of the migration target volume.

In Step 2404, the alert generator 320 specifies from the I/O path information 319 all the resources directly and indirectly belonging to all of the I/O paths specified in Step 2403.

Step 2405 and beyond are carried out for all the resources specified in Steps 2402 and 2404 (hereinafter, will be called "target resources" in the explanation of this FIG. 24).

In Step 2405, the alert generator 320 determines if there is a target resource that was not processed in this alert definition generation process. If an unprocessed target resource exists, the alert generator 320 proceeds to Step 2406, and if an unprocessed target resource does not exist, processing ends.

In Step 2406, the alert generator 320 selects one of the above-mentioned unprocessed target resources.

In Step 2407, the alert generator 320 determines whether or not there are unprocessed metrics among all the metrics possessed by the target resource selected in Step 2406. The identifier of a metric of the resource can be acquired from the metric value information 313. If unprocessed metrics exist, the alert generator 320 proceeds to Step 2408, and if unprocessed metrics do not exist, the alert generator 320 returns to Step 2405.

In Step 2408, the alert generator 320 selects one of the above-mentioned unprocessed metrics.

In Step 2409, the alert generator 320 references the alert information 316, and determines whether or not an alert definition for normal processing has been configured for the metric selected in Step 2408. If an alert definition for normal processing has not been configured, the alert generator 320 returns to Step 2407, and if this alert definition has been configured, the alert generator 320 proceeds to Step 2410.

In Step 2410, the alert generator 320 generates, as an alert definition for a trial period, an alert definition comprising a stricter alert condition than the alert condition in the alert definition for normal processing (the alert definition specified in Step 2409) corresponding to the target resource selected in Step 2406 and the metric selected in Step 2408. More specifically, for example, the alert generator 320 generates, as an alert definition for a trial period for the above-mentioned selected target resource and metric, an alert definition, which changes the evaluation interval 1707 in the alert definition for normal processing corresponding to this target resource and metric to the evaluation interval 1903 for a trial period in the alert generation control information 321.

Furthermore, a value smaller than the value of the evaluation interval 1707 in the alert definition for normal processing is used as the value of the evaluation interval 1903 for a trial period in the alert generation control information 321. However, if in Step 2410 it is detected that the value of the evaluation interval 1903 for the trial period in the alert generation control information 321 is greater than the value of the evaluation interval 1707 in the normal processing alert definition corresponding to the above-mentioned target resource and metric, a value smaller than the value of the evaluation interval 1707 in this normal processing alert definition is configured as the value of the evaluation interval in the trial period alert definition.

A method for configuring a value that is smaller than the value of the evaluation interval 1707 in a normal processing alert definition as described hereinabove has been explained as the method for making an alert condition stricter, but instead of this, it is also possible to use a method in which the number of metric values acquired per unit of time is increased to a number larger than that of normal processing without changing the value of the evaluation interval 1707. For example, for a logical volume, only "number of I/Os per second" and "transmission rate" are acquired for normal processing, but it is also possible to employ a method for acquiring "number of read I/Os per second", "number of write I/Os per second", "read transmission rate", and "write transmission rate" in addition thereto for a trial period.

According to the alert definition generation process described hereinabove, a trial period alert definition is automatically prepared for all resources affected by I/O path switching due to a migration. The respective alert definitions are automatically validated by the processing explained using FIG. 21. An alert condition in a trial period alert definition is automatically made stricter than the alert condition in a normal processing alert definition. Specifically, the evaluation interval is shortened. Thus, when a performance problem arises due to a change in I/O load distribution occurring within a fixed period of time from the point in time when a migration ended, this problem can be quickly detected, and an action corresponding to this problem can be executed.

FIG. 25 is a flowchart of the processing in Step 2203 of FIG. 22 (an alert definition generation process for a migration period).

In Step 2501, the alert generator 320 specifies a migration I/O path, which corresponds to a migration information element acquired by the hierarchy management information collector 324 at the timing at which the alert definition generation process for this migration target volume was started, by referencing the migration I/O path information 323.

In Step 2502, the alert generator 320 specifies, from the migration I/O path information 323 and I/O path information 319, all the resources, which directly and indirectly belong to the migration I/O path specified in Step 2501.

Step 2503 and beyond are carried out for all the resources specified in Step 2502 (hereinafter, called "target resources" in this explanation of FIG. 25).

In Step 2503, the alert generator 320 determines whether or not unprocessed target resources exist in this alert definition generation process. If unprocessed target resources exist, the alert generator 320 moves to Step 2504, and if unprocessed target resources do not exist, processing ends.

In Step 2504, the alert generator 320 selects one of the above-mentioned unprocessed target resources.

In Step 2505, the alert generator 320 determines whether or not there are unprocessed metrics among all the metrics possessed by the target resource selected in Step 2504. An identifier of a resource's metrics can be acquired from the metric value information 313. If unprocessed metrics exist, the alert generator 320 proceeds to Step 2506, and if unprocessed metrics do not exist, the alert generator 320 returns to Step 2503.

In Step 2506, the alert generator 320 selects one of the above-mentioned unprocessed metrics.

In Step 2507, the alert generator 320 references the alert information 316, and determines whether or not a normal processing alert definition has been configured for the metric selected in Step 2506. If a normal processing alert definition has not be configured, the alert generator 320 returns to Step 2505, and if this definition has been configured, the alert generator 320 proceeds to Step 2508.

In Step 2508, the alert generator 320 generates a migration period alert definition corresponding to the metric selected in Step 2506 of the target resource selected in Step 2504. More specifically, for example, the alert generator 320 generates, as a migration period alert definition for this target resource and metric, an alert definition, which changes the evaluation interval 1707 in the normal processing alert definition corresponding to the above-mentioned resource and metric to the migration period evaluation interval 1904 in the alert generation control information 321. The threshold of this migration period alert definition can be a value obtained by correcting the threshold 1706 in a normal processing' alert definition (alert definition specified in Step 2507) based on the threshold acceptance rate 1905 in the alert generation control information 321. Further, the action method for this migration period alert definition can be the sending of a command (hereinafter, temporary suspension/retardation command) for temporarily suspending or retarding a migration.

According to the alert definition generation process described above, a migration period alert definition is automatically prepared for all resources affected by the execution of a migration. The respective alert definitions are automatically validated by the processing explained using FIG. 21. Thus, it is possible to properly monitor the performance of resources impacted during a migration period in accordance with the affects of this migration execution. If a performance problem is detected in this monitoring, a temporary suspension/retardation command can be sent to the migration executor 308 via (or not via) the hierarchy management software 307 either instead of or in addition to sending a notification to a prescribed address. The migration executor 308, upon receiving a temporary suspension/retardation command, can temporarily suspend or retard (slow down the read rate and/or write rate of data) a migration being executed.

A number of embodiments of the present invention has been explained hereinabove, but these embodiments are merely examples for explaining the present invention, and do not purport to limit the scope of the present invention solely to these embodiments. The present invention can be put into practice in a variety of other modes.

What is claimed is:

1. A management device, which monitors the performance of a plurality of resources residing in a computer system comprising a storage system for copying data from a copy source volume to a copy target volume, the management device comprising:
 a policy determination unit that determines a policy corresponding to a copy relevant resource which is a resource related to the copying in policy information expressing a plurality of polices corresponding to the plurality of resources, based on a copy relevant period which is a time period related to the copying; and
 a resource evaluation unit that determines whether or not to execute a predefined action based on a policy of the plurality of policies, which corresponds to an evaluation-target resource of the plurality of resources, using a performance value of this evaluation-target resource,
 wherein the following three periods (A) to (C) comprise copy relevant periods,
 (A) a first period which is an execution period of the copying,
 (B) a second period which is later than the first period and a temporary period from immediately subsequent to the end of the copying until a fixed time has elapsed, and
 (C) a third period which is later than the second period, wherein, with respect to the policy determination unit:
  (a) during the first period, references path management information expressing which resource belongs to which path, to specify, as the copy relevant resources, resources belonging directly and indirectly to a path over which data passes during copying from the copy source volume to the copy target volume as the resources related to the copying, and determines a copy-period policy, which corresponds to an execution period of the copying, for the specified resources,
  (b) during the second period, references the path management information to specify, as the copy relevant resources, resources which directly and indirectly belongs to a path belonging to the copy source volume, and a resource, which directly and indirectly belongs to a path belonging to the copy target volume, as the resources related to the copying, and determines, and
  (c) during the third period, references tier management information expressing the relationship between a plurality of tiers and a plurality of resources of the storage system, to determine a copy target corresponding policy which is a policy corresponding to the copy target volume as the copy relevant resource subsequent to the copying having ended, based on the performance value or policy of a resource belonging to a first tier to which the copy source volume of the plurality of logical volumes belongs, and the performance value or policy of a resource belonging to a second tier to which the copy target volume of the plurality of logical volumes belongs,
 wherein, with respect to the resource evaluation unit:
  (p) during the above (a), during the copy execution period, uses the performance value of the evaluation-target resource to determine whether or not to execute an action based on the determined copy-period policy,
  (q) during the above (b), during the temporary period, uses the performance value of the evaluation-target resource to determine whether or not to execute an action based on the determined temporary period policy, and
 wherein the temporary period policy is a stricter policy than the policy for a period subsequent to the temporary period.

2. The management device according to claim 1, wherein, as for the above (c), the copy target corresponding policy is a threshold, which corresponds to the copy target volume, and is compared against the performance value of a resource; and
 as for the above (c), the policy determination unit determines a threshold corresponding to the copy target volume based on the performance value of a resource belonging to the first tier, and on the performance value of a resource belonging to the second tier.

3. The management device according to claim 1, wherein, as for the above (c), the copy target corresponding policy is an interval of time for executing an evaluation, which is a determination as to whether or not to execute an action based on the performance value of a resource; and
 as for the above (c), the policy determination unit determines an evaluation time interval corresponding to the copy target volume based on both the evaluation time interval of a resource belonging to the first tier and the evaluation time interval of a resource belonging to the second tier, or on the evaluation time interval of a resource belonging to the second tier.

4. The management device according to claim 1, further comprising a history manager, which adds information expressing the corresponding relationship between an identifier of the copy source volume and a policy corresponding to this copy source volume, to history information expressing the history of the corresponding relationship, and
 as for the above (c), when either the copy target volume or the second tier to which this copy target volume belongs coincides with either the copy source volume specified from the history information or the tier to which this copy source volume belongs, the policy determination unit determines either the policy corresponding to this copy source volume, or the policy corresponding to another logical volume belonging to this tier, as the copy target corresponding policy.

5. The management device according to claim 1, wherein, as for the above (b), the policy is either a time interval for executing an evaluation, which is a determination as to whether or not to execute an action based on the performance value of a resource, or the number of performance values acquired in an evaluation time interval, and
 the evaluation time interval for the temporary period is shorter than the evaluation time interval
 for a period subsequent to the temporary period, and the number for the temporary period is larger than the number acquired subsequent to the temporary period.

6. The management device according to claim 1, further comprising an action execution controller for validating the determined temporary period policy subsequent to the end of the copying, and
 as for the above (b), if the temporary period policy is not valid, the resource evaluation unit does not execute a determination based on this temporary period policy, and if this temporary period policy is valid, the resource evaluation unit executes a determination based on this temporary period policy.

7. The management device according to claim 1, wherein, as for the above (a), the policy is either a threshold which is compared against the performance value of a resource, an interval of time for executing an evaluation, which is a determination as to whether or not to execute an action based on the performance value of a resource, or the number of performance values acquired during an evaluation time interval, and as for the above (a), the policy determination unit determines either a copy-period threshold, evaluation time interval, or number of performance values corresponding to the specified resource to be either a pre-defined value, or a value obtained by correcting this value.

8. The management device according to claim 1, wherein, as for the above (q), if it is determined during the copy execution period to execute an action for the evaluation-target resource, the resource evaluation unit indicates to the storage system to suspend or retard the copying as the action execution.

9. The management device according to claim 1, further comprising an action execution controller for validating the determined copy-period policy during the copy period, and as for the above (q), if the copy-period policy is not valid, the resource evaluation unit does not execute a determination based on this copy-period policy, and if this copy-period policy is valid, the resource evaluation unit executes a determination based on this copy-period policy.

10. The management device according to claim 1, further comprising an action execution controller for controlling the execution of an action, the action execution controller validates the determined copy-period policy during the copy period, and validates the temporary period policy subsequent to the copy having ended; and the resource evaluation unit uses the performance value of the evaluation-target resource to determine whether or not to execute an action based on the policy, which has been validated.

11. The management device according to claim 10, wherein the copy target corresponding policy in the above (c) is a valid policy corresponding to the copy target volume subsequent to the copy having ended.

12. The management device according to claim 1, further comprising an action execution controller for controlling the execution of an action, the action execution controller validates the determined temporary period policy subsequent to the copy having ended; and the resource evaluation unit uses the performance value of the evaluation-target resource to determine whether or not to execute an action based on the policy, which has been validated.

13. A computer system, comprising:
a storage system for copying data from a copy source volume to a copy target volume of a plurality of logical volumes;
a host computer for issuing an I/O command, which specifies at least one of the plurality of logical volumes;
a relay device for relaying an access command sent from the host computer;
a policy determination unit for determining, based on a copy relevant period which is a time period related to the copying, a policy corresponding to a copy relevant resource which is a resource related to the copying in policy information expressing a plurality of policies corresponding to a plurality of resources related to the storage system, the host computer, and the relay device; and
a resource evaluation unit for using the performance value of an evaluation-target resource to determine whether or not to execute a predefined action based on a policy of the plurality of policies, which corresponds to this evaluation-target resource of the plurality of resources,
wherein the following three periods (A) to (C) comprise copy relevant periods,
(A) a first period which is an execution period of the copying,
(B) a second period which is later than the first period and a temporary period from immediately subsequent to the end of the copying until a fixed time has elapsed, and
(C) a third period which is later than the second period,
wherein, with respect to the policy determination unit:
(a) during the first period, references path management information expressing which resource belongs to which path, to specify, as the copy relevant resources, resources belonging directly and indirectly to a path over which data passes during copying from the copy source volume to the copy target volume as the resources related to the copying, and determines a copy-period policy, which corresponds to an execution period of the copying, for the specified resources,
(b) during the second period, references the path management information to specify, as the copy relevant resources, resources which directly and indirectly belongs to a path belonging to the copy source volume, and a resource, which directly and indirectly belongs to a path belonging to the copy target volume, as the resources related to the copying, and determines, and
(c) during the third period, references tier management information expressing the relationship between a plurality of tiers and a plurality of resources of the storage system, to determine a copy target corresponding policy which is a policy corresponding to the copy target volume as the copy relevant resource subsequent to the copying having ended, based on the performance value or policy of a resource belonging to a first tier to which the copy source volume of the plurality of logical volumes belongs, and the performance value or policy of a resource belonging to a second tier to which the copy target volume of the plurality of logical volumes belongs,
wherein, with respect to the resource evaluation unit:
(p) during the above (a), during the copy execution period, uses the performance value of the evaluation-target resource to determine whether or not to execute an action based on the determined copy-period policy, and
(q) during the above (b), during the temporary period, uses the performance value of the evaluation-target resource to determine whether or not to execute an action based on the determined temporary period policy, and
wherein the temporary period policy is a stricter policy than the policy for a period subsequent to the temporary period.

14. A resource monitoring method, comprising the steps of:
(X) determining, based on a copy relevant period which is a time period related to copying, a policy corresponding to a copy relevant resource which is a resource related to the copying in policy information expressing a plurality of policies corresponding to a plurality of resources residing in a computer system comprising a storage system for copying data from a copy source volume to a copy target volume; and
(Y) determining, by using the performance value of an evaluation-target resource, whether or not to execute a predefined action based on a policy of the plurality of policies, which corresponds to this evaluation-target resource of the plurality of resources, wherein the following three periods (A) to (C) comprise copy relevant periods, (A) a first period which is an execution period of the copying, (B) a second period which is later than the first period and a temporary period from immediately subsequent to the end of the copying until a fixed time has elapsed, and (C) a third period which is later than the second period, wherein in the above step (X):
- (a) during the first period, references path management information expressing which resource belongs to which path, to specify, as the copy relevant resources, resources belonging directly and indirectly to a path over which data passes during copying from the copy source volume to the copy target volume as the resources related to the copying, and determines a copy-period policy, which corresponds to an execution period of the copying, for the specified resources,
- (b) during the second period, references the path management information to specify, as the copy relevant resources, resources which directly and indirectly belongs to a path belonging to the copy source volume, and a resource, which directly and indirectly belongs to a path belonging to the copy target volume, as the resources related to the copying, and determines, and
- (c) during the third period, references tier management information expressing the relationship between a plurality of tiers and a plurality of resources of the storage system, to determine a copy target corresponding policy which is a policy corresponding to the copy target volume as the copy relevant resource subsequent to the copying having ended, based on the performance value or policy of a resource belonging to a first tier to which the copy source volume of the plurality of logical volumes belongs, and the performance value or policy of a resource belonging to a second tier to which the copy target volume of the plurality of logical volumes belongs, wherein in the above step (Y):
- (p) during the above (a), during the copy execution period, uses the performance value of the evaluation-target resource to determine whether or not to execute an action based on the determined copy-period policy, and
- (q) during the above (b), during the temporary period, uses the performance value of the evaluation-target resource to determine whether or not to execute an action based on the determined temporary period policy, and
  - wherein the temporary period policy is a stricter policy than the policy for a period subsequent to the temporary period.

15. A non-transitory computer readable medium containing a computer program which causes a computer to execute the steps of:

(X) determining, based on a copy relevant period which is a time period related to copying, a policy corresponding to a copy relevant resource which is a resource related to the copying in policy information expressing a plurality of policies corresponding to a plurality of resources residing in a computer system comprising a storage system for copying data from a copy source volume to a copy target volume; and (Y) determining, by using the performance value of an evaluation-target resource, whether or not to execute a predefined action based on a policy of the plurality of policies, which corresponds to this evaluation-target resource of the plurality of resources, wherein the following three periods (A) to (C) comprise copy relevant periods, (A) a first period which is an execution period of the copying, (B) a second period which is later than the first period and a temporary period from immediately subsequent to the end of the copying until a fixed time has elapsed, and (C) a third period which is later than the second period, wherein in the above step (X):
- (a) during the first period, references path management information expressing which resource belongs to which path, to specify, as the copy relevant resources, resources belonging directly and indirectly to a path over which data passes during copying from the copy source volume to the copy target volume as the resources related to the copying, and determines a copy-period policy, which corresponds to an execution period of the copying, for the specified resources,
- (b) during the second period, references the path management information to specify, as the copy relevant resources, resources which directly and indirectly belongs to a path belonging to the copy source volume, and a resource, which directly and indirectly belongs to a path belonging to the copy target volume, as the resources related to the copying, and determines, and
- (c) during the third period, references tier management information expressing the relationship between a plurality of tiers and a plurality of resources of the storage system, to determine a copy target corresponding policy which is a policy corresponding to the copy target volume as the copy relevant resource subsequent to the copying having ended, based on the performance value or policy of a resource belonging to a first tier to which the copy source volume of the plurality of logical volumes belongs, and the performance value or policy of a resource belonging to a second tier to which the copy target volume of the plurality of logical volumes belongs, wherein in the above step (Y):
- (p) during the above (a), during the copy execution period, uses the performance value of the evaluation-target resource to determine whether or not to execute an action based on the determined copy-period policy, and
- (q) during the above (b), during the temporary period, uses the performance value of the evaluation-target resource to determine whether or not to execute an action based on the determined temporary period policy, and
  - wherein the temporary period policy is a stricter policy than the policy for a period subsequent to the temporary period.

* * * * *